US012654365B2

(12) United States Patent
Qiao et al.

(10) Patent No.: US 12,654,365 B2
(45) Date of Patent: Jun. 16, 2026

(54) STRUCTURAL COMPOSITE MATERIALS, PROCESSES, AND SYSTEMS

(71) Applicant: The Regents of the University of California, Oakland, CA (US)

(72) Inventors: Yu Qiao, San Diego, CA (US); Kiwon Oh, La Jolla, CA (US); Haozhe Yi, La Jolla, CA (US); Rui Kou, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 237 days.

(21) Appl. No.: 17/925,665

(22) PCT Filed: May 17, 2021

(86) PCT No.: PCT/US2021/032743
§ 371 (c)(1),
(2) Date: Nov. 16, 2022

(87) PCT Pub. No.: WO2021/236507
PCT Pub. Date: Nov. 25, 2021

(65) Prior Publication Data
US 2023/0278263 A1 Sep. 7, 2023

Related U.S. Application Data

(60) Provisional application No. 63/026,429, filed on May 18, 2020.

(51) Int. Cl.
*B29C 33/30* (2006.01)
(52) U.S. Cl.
CPC .......... *B29C 33/302* (2013.01); *B29C 33/308* (2013.01)

(58) Field of Classification Search
CPC ... B29C 33/308; B29C 33/302; B29C 44/585; B28B 3/06; B28B 3/08
See application file for complete search history.

(56) References Cited

U.S. PATENT DOCUMENTS 3,264,381 A * 8/1966 Stevens ................. B29C 44/445
264/45.2
3,830,607 A * 8/1974 Baxendale ............ B30B 11/001
425/405.2

(Continued)

FOREIGN PATENT DOCUMENTS

FR 1445820 A * 7/1966

OTHER PUBLICATIONS

International Preliminary Report on Patentability in International Appln. No. PCT/US2016/044551, dated Nov. 29, 2016, 12 Pages.

(Continued)

*Primary Examiner* — Virak Nguon
(74) *Attorney, Agent, or Firm* — Fish & Richardson P.C.

(57) ABSTRACT

The disclosure features systems, devices, and methods of sectioned compaction of composite materials for large parts. An example system includes a mold assembly, including a bottom wall, one or more side walls coupled to the bottom wall, one or more pistons, wherein the bottom wall, the one or more side walls, and the one or more pistons at least partially define a mold cavity, and wherein each of the one or more pistons are independently movable to reduce the volume of the mold cavity; and a plurality of fasteners configured to selectively immobilize the one or more pistons; and a compression actuator configured to sequentially advance the pistons from an initial position to an actuated position to compress a composite material within the mold cavity.

9 Claims, 16 Drawing Sheets

(56) References Cited

U.S. PATENT DOCUMENTS

| | | | |
|---|---|---|---|
| 4,235,836 A | 11/1980 | Wassell et al. | |
| 4,368,020 A | 1/1983 | Brown et al. | |
| 4,732,331 A | 3/1988 | Hughes | |
| 5,410,946 A * | 5/1995 | Hoshi | B21D 24/14 |
| | | | 100/269.06 |
| 6,083,439 A | 7/2000 | Nastke et al. | |
| 6,355,210 B1 | 3/2002 | Hirabayashi | |
| 10,919,805 B2 | 2/2021 | Qio et al. | |
| 2002/0109267 A1* | 8/2002 | Herbst | B29C 43/36 |
| | | | 264/328.7 |
| 2002/0120244 A1 | 8/2002 | Sawyer et al. | |
| 2003/0065082 A1 | 4/2003 | Blanken et al. | |
| 2005/0031848 A1 | 2/2005 | Wilson et al. | |
| 2006/0030948 A1 | 2/2006 | Manrique et al. | |
| 2006/0030953 A1 | 2/2006 | Manrique et al. | |
| 2006/0188726 A1 | 8/2006 | Muenz et al. | |
| 2009/0181239 A1 | 7/2009 | Fan et al. | |
| 2010/0310408 A1* | 12/2010 | Nagata | B30B 11/027 |
| | | | 419/38 |
| 2013/0210953 A1 | 8/2013 | Kilway et al. | |
| 2013/0216802 A1 | 8/2013 | Leung et al. | |
| 2014/0248463 A1 | 9/2014 | Tam et al. | |
| 2018/0215666 A1 | 8/2018 | Qiao | |

OTHER PUBLICATIONS

International Preliminary Report on Patentability in International Appln. No. PCT/US2021/032743, mailed on Dec. 1, 2022, 10 pages.

International Search Report and Written Opinion in International Application No. PCT/US2016/044551, dated Nov. 4, 2016, 15 pages.

International Search Report and Written Opinion in International Appln. No. PCT/US2021/032743, mailed on Sep. 24, 2021, 13 pages.

Lim et al., "Mitigating CO2 emissions of concrete manufacturing through CO2-enabled binder reduction," Environmental Research Letters, Oct. 29, 2019, 14(11):114014, 10 pages.

Oh et al., "Compaction self-assembly of ultralow-binder-content particulate composites," Composites Part B: Engineering, Oct. 15, 2019, 175:107144, 5 pages.

* cited by examiner

200

200

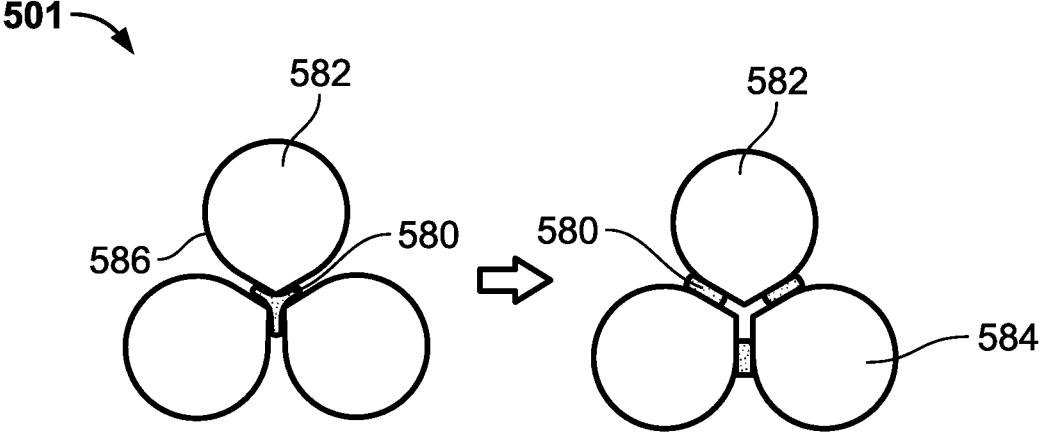
FIG. 5
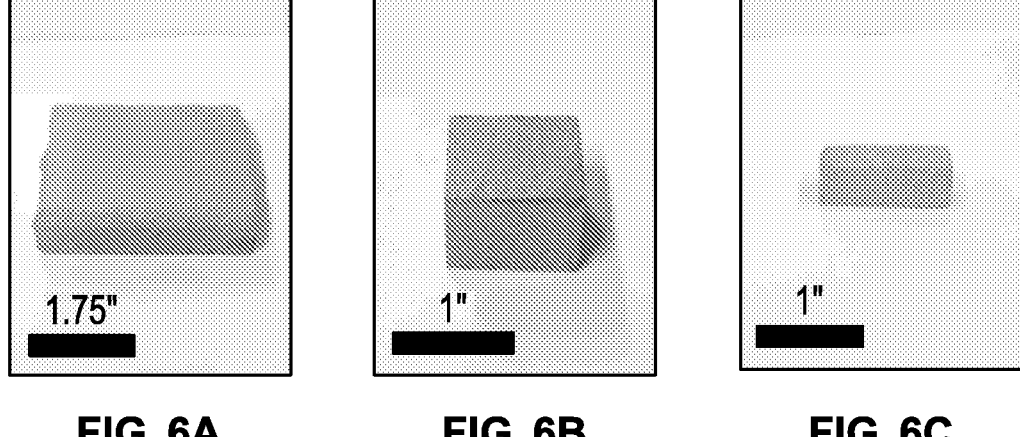
FIG. 6A      FIG. 6B      FIG. 6C

726-4
726-3
726-2
726-1

700

722

720

724

700

740

726-4
726-3
726-1
726-2

722

720

732

724

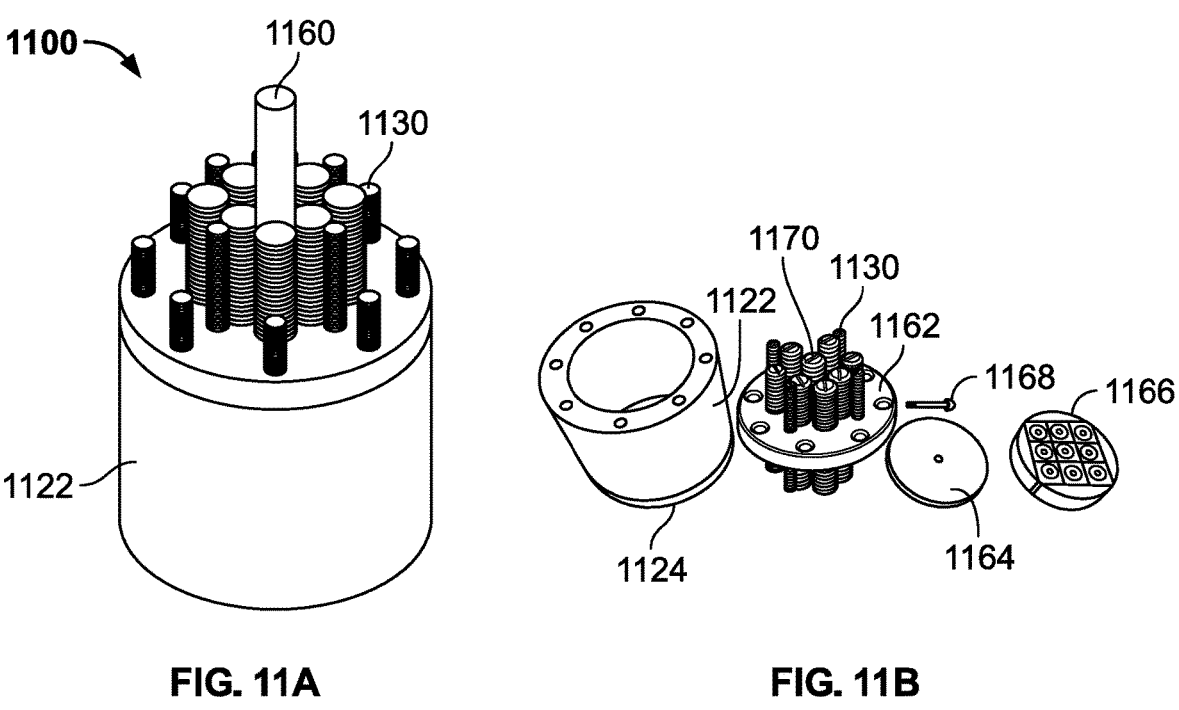
FIG. 11A          FIG. 11B
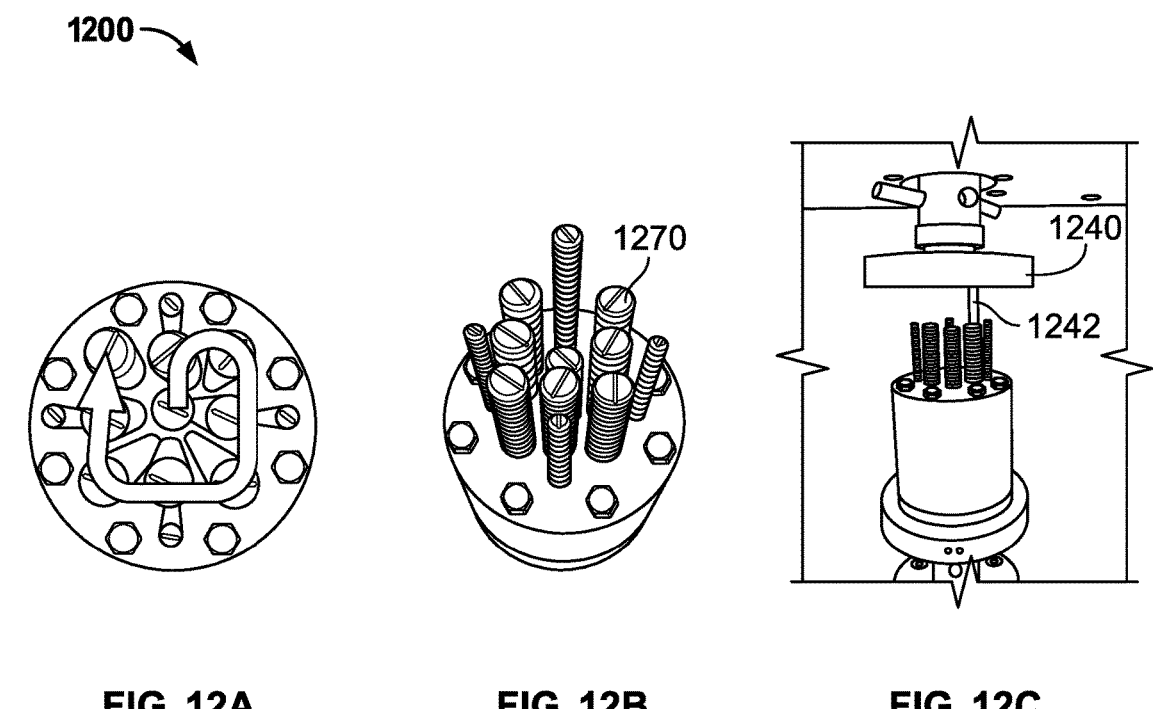
FIG. 12A          FIG. 12B          FIG. 12C

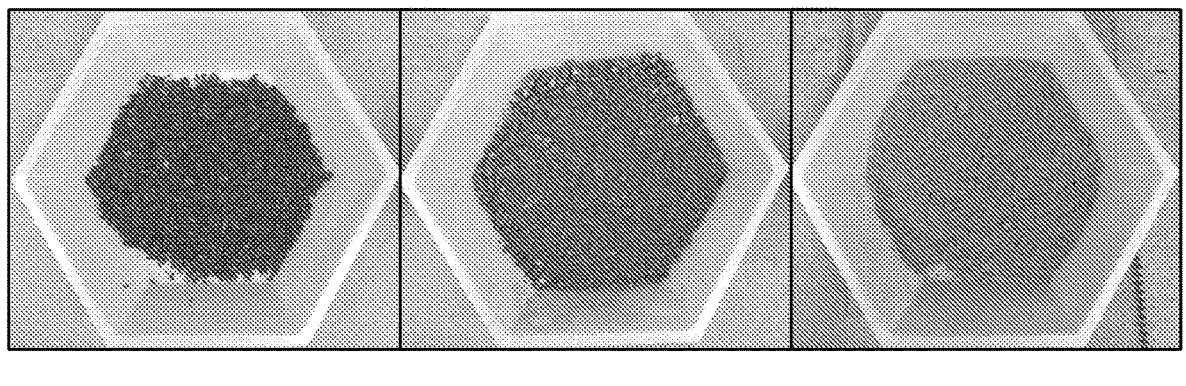
FIG. 13A            FIG. 13B            FIG. 13C
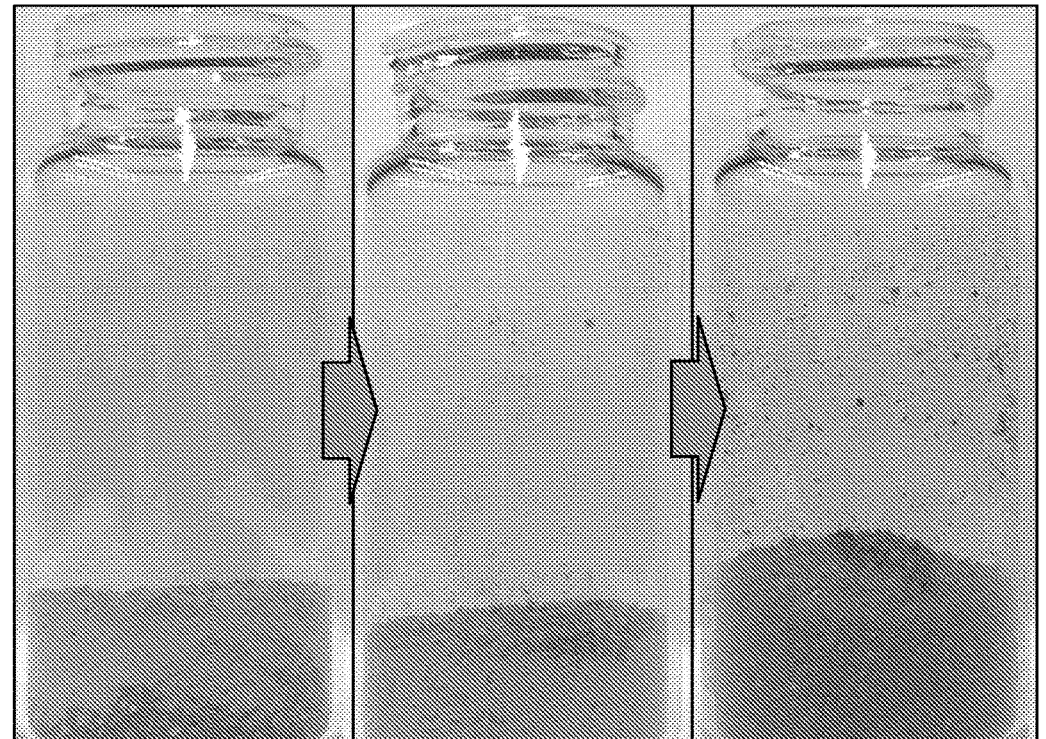
FIG. 14A            FIG. 14B            FIG. 14C

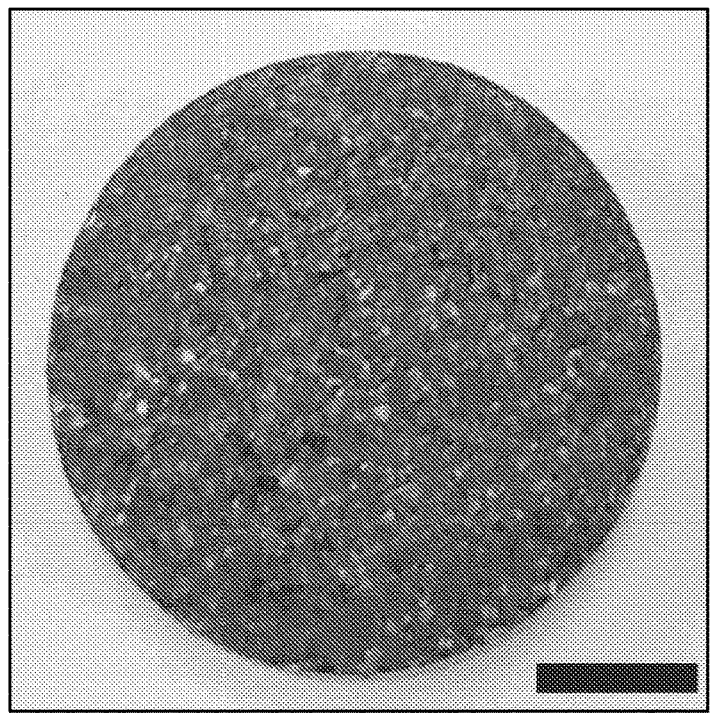
FIG. 15A
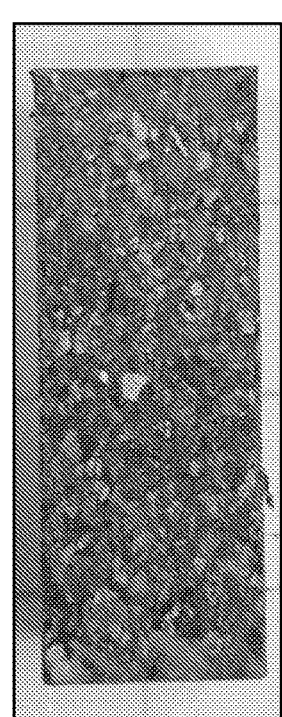
FIG. 15B
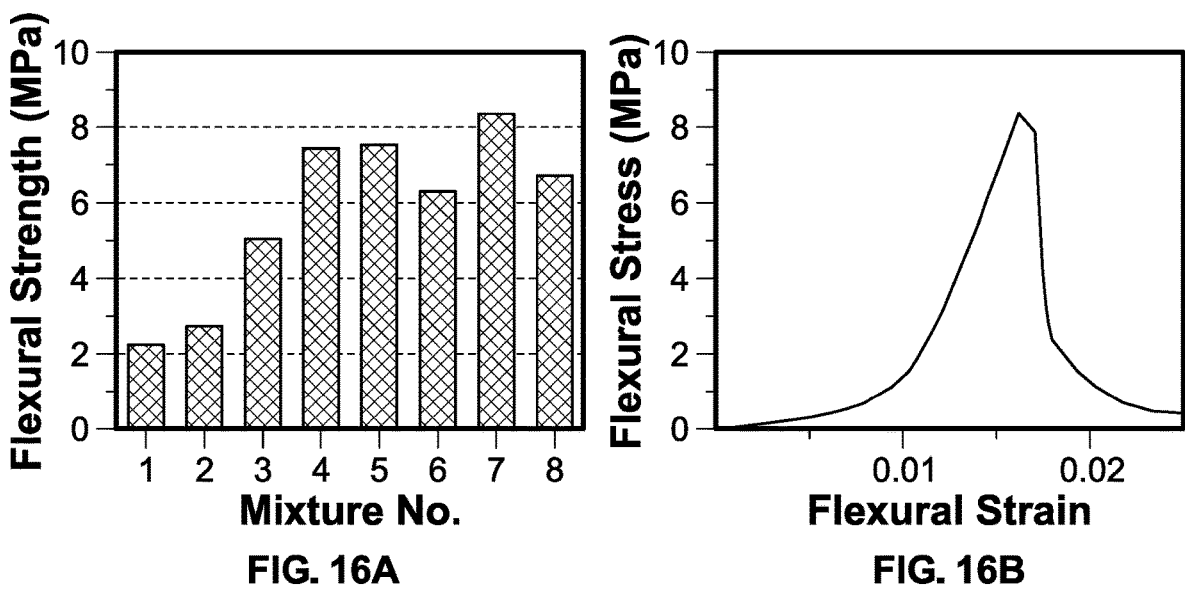
FIG. 16A
FIG. 16B

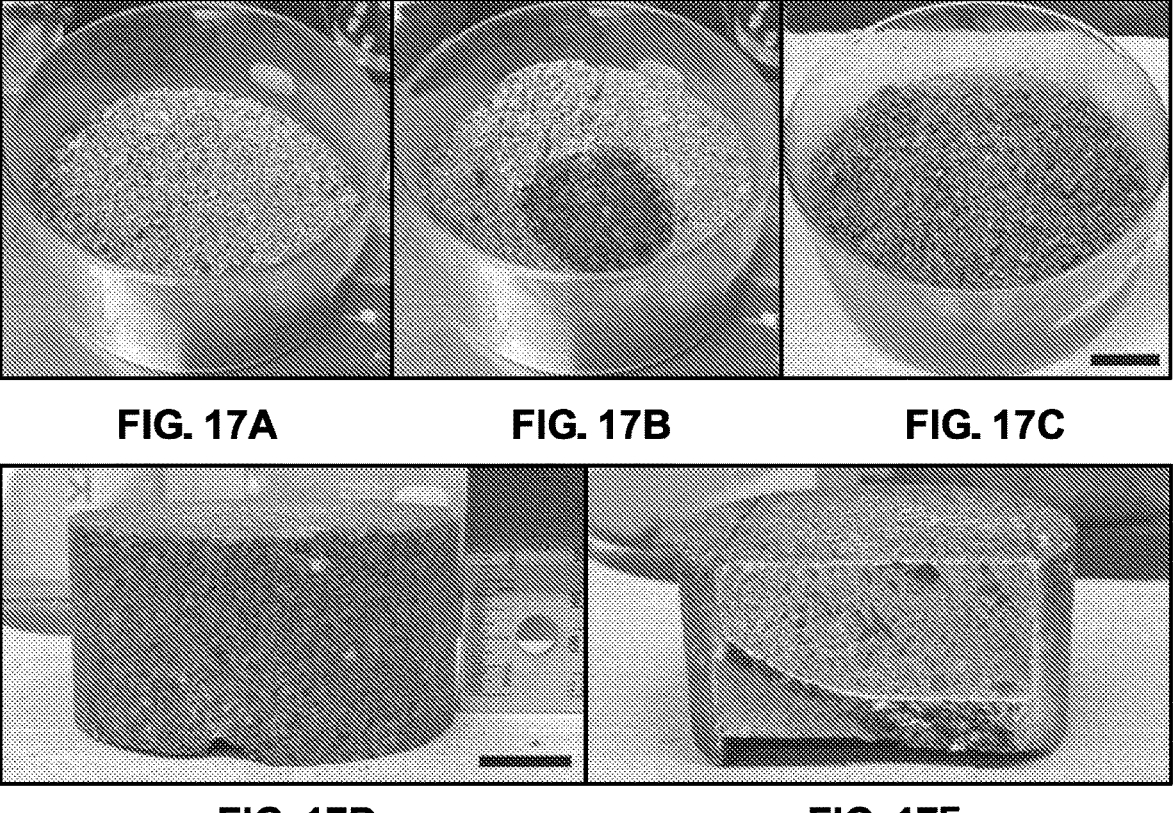
FIG. 17A          FIG. 17B          FIG. 17C
FIG. 17D                    FIG. 17E

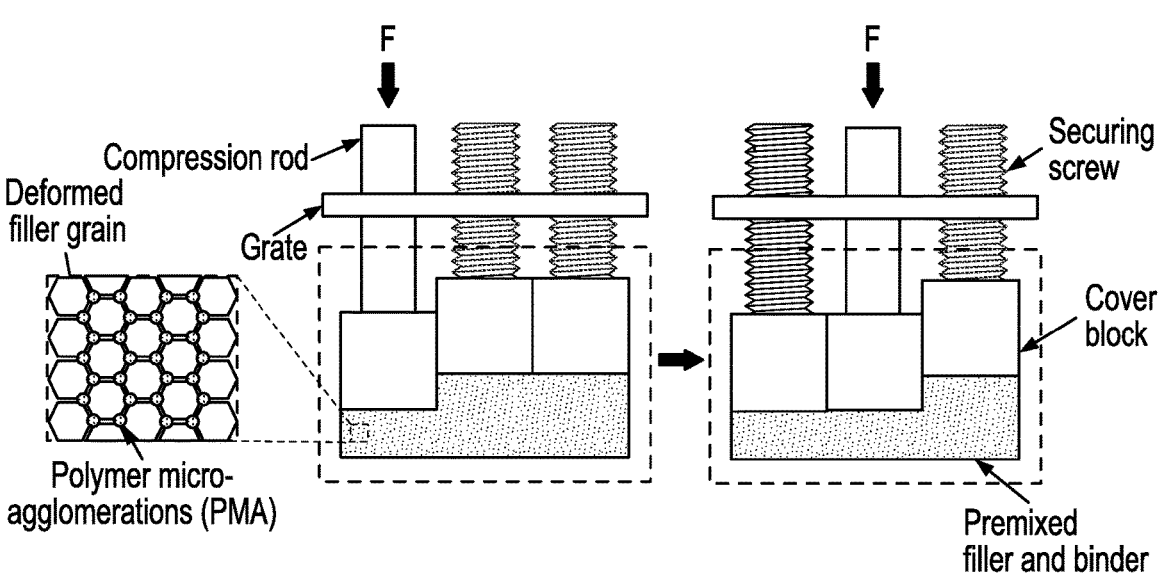
FIG. 19
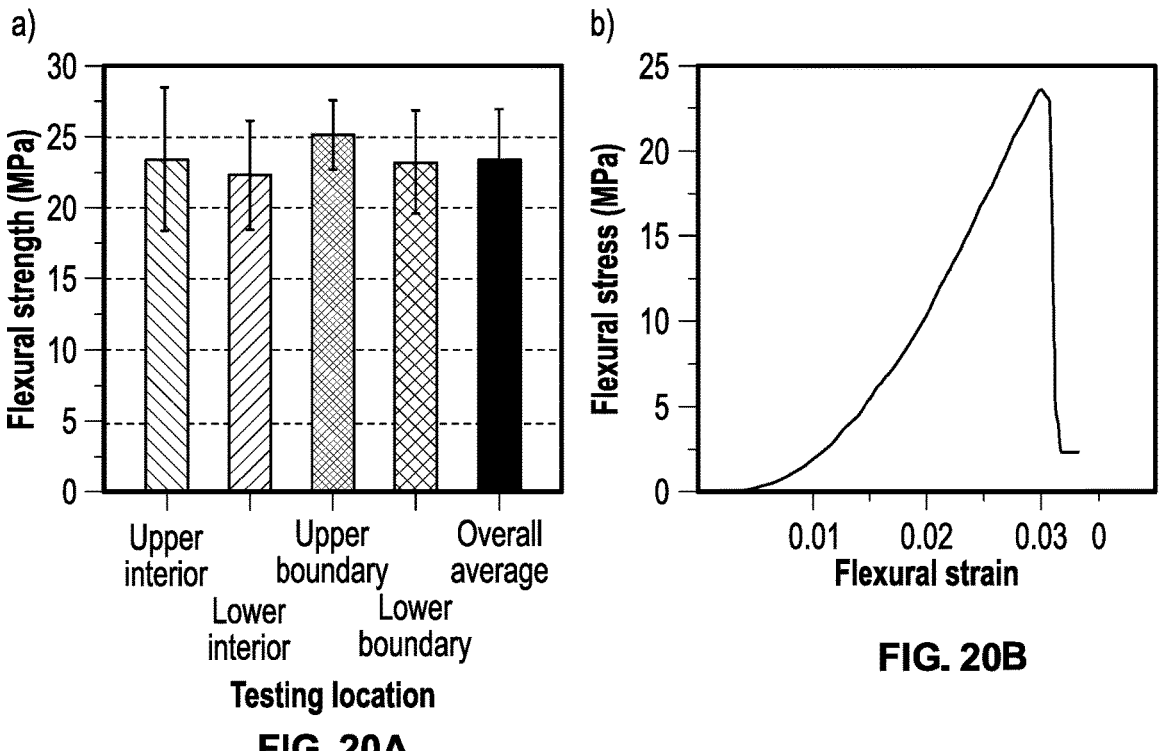
FIG. 20A
FIG. 20B

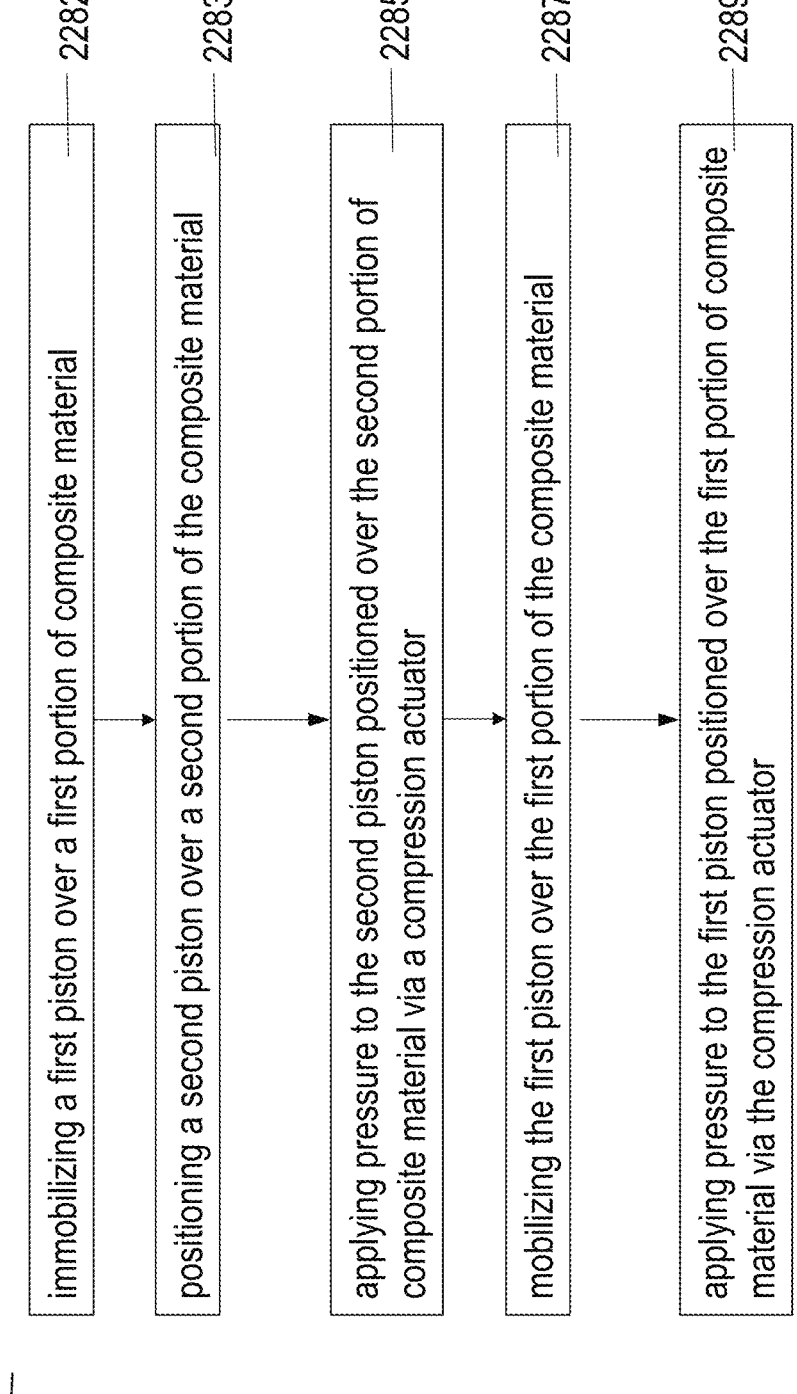

immobilizing a first piston over a first portion of composite material — 2282 positioning a second piston over a second portion of the composite material — 2283 applying pressure to the second piston positioned over the second portion of composite material via a compression actuator — 2285 mobilizing the first piston over the first portion of the composite material — 2287 applying pressure to the first piston positioned over the first portion of composite material via the compression actuator — 2289

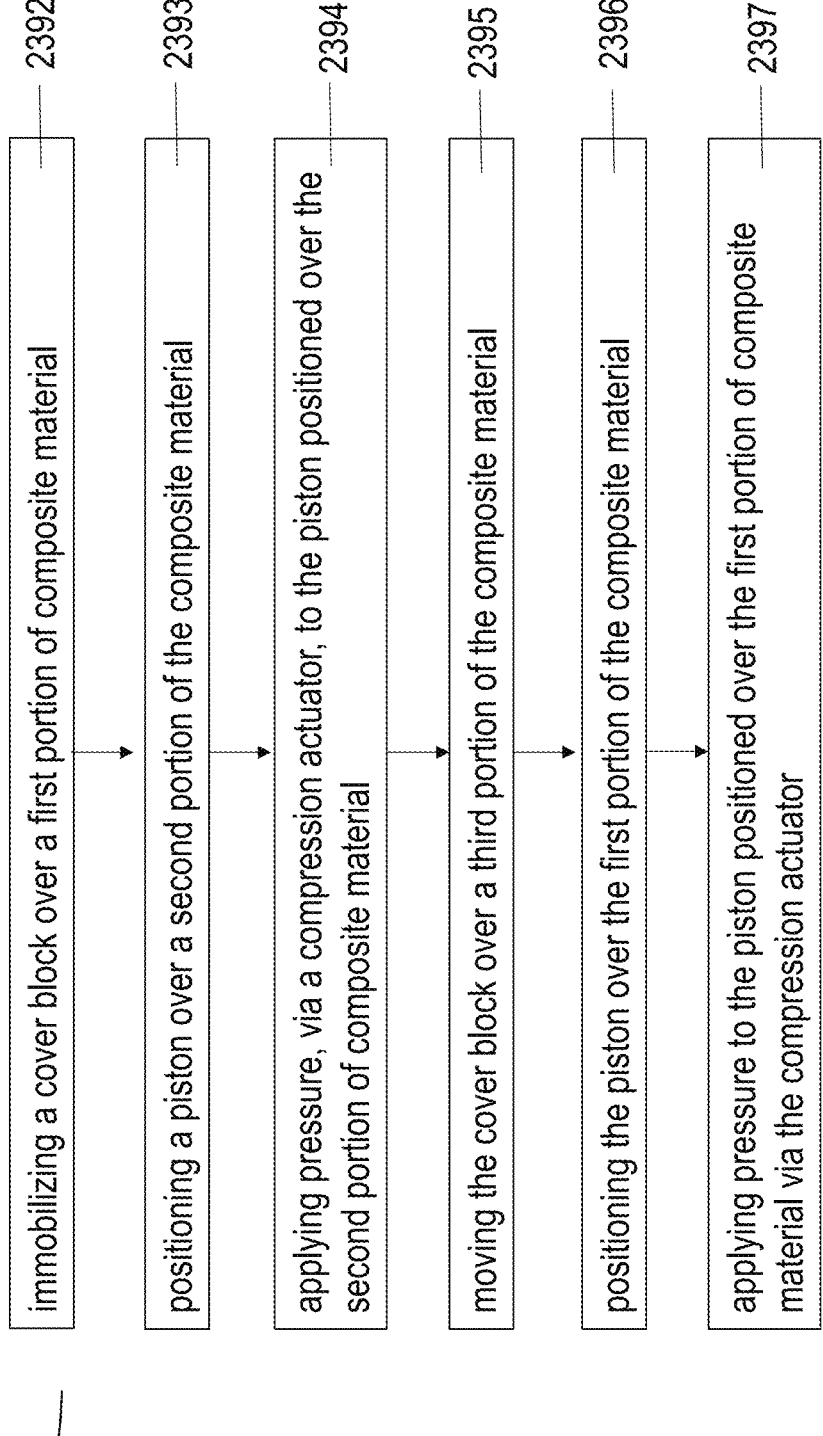

immobilizing a cover block over a first portion of composite material ——2392 positioning a piston over a second portion of the composite material ——2393 applying pressure, via a compression actuator, to the piston positioned over the second portion of composite material ——2394 moving the cover block over a third portion of the composite material ——2395 positioning the piston over the first portion of the composite material ——2396 applying pressure to the piston positioned over the first portion of composite material via the compression actuator ——2397

STRUCTURAL COMPOSITE MATERIALS, PROCESSES, AND SYSTEMS

CROSS-REFERENCE TO RELATED APPLICATIONS

This application is a National Stage Application under 35 U.S.C. § 371 and claims the benefit of International Application No. PCT/US2021/032743, filed May 17, 2021, which claims priority to U.S. Provisional Patent Application No. 63/026,429, filed on May 18, 2020, the entire contents of which are incorporated herein by reference.

GOVERNMENT SPONSORED RESEARCH

This invention was made with government support under Grant Nos. DE-AR0001144 and DE-AR0000947 awarded by the Department of Energy. The Government has certain rights in the invention.

TECHNICAL FIELD

This disclosure relates to composite materials and methods of making composite materials, such as composite materials and methods that can be used for a variety of applications and products (e.g., on-site construction, production of pre-cast structural components).

BACKGROUND

Cement, such as Portland cement, was developed in the 1800's. Portland cement is a hydraulic material including, calcium silicates, calcium oxide, silicon dioxide, aluminum oxide, ferric oxide, and calcium sulfate. The formation of Portland cement involves calcination at high temperatures (e.g., about 1550° C.). Portland cement can be set in hours to days using water by means of a series of chemical reactions, with hardening over the course of a few weeks. Portland cement is used in the production of concrete when mixed with an aggregate (e.g., gravel, stone, or sand) and water.

Portland cement can be used for precast parts. Precast parts have been widely used in construction and maintenance of buildings and transportation systems as, for example, panels, columns, supports, and pipes. Using precast parts can, in some cases, reduce the duration of construction projects and simplify construction procedures. About 4 GJ of energy is consumed to produce one ton of Portland cement, accounting for 5-10% of the entire industrial energy consumption. In addition, Portland cement production accounts for approximately 3-10% of the total human-produced atmospheric carbon dioxide.

Polymer cements can be used in many applications as a substitute for Portland cement, and have a high tensile strength in addition to a compressive strength that is comparable to or higher than Portland cement. Binders used in polymer cements function to bond together the filler material portion of the cement, and bear much of the load that the cement is subjected to when used in structural applications.

SUMMARY

Some embodiments described herein facilitate sequentially compressing a portion of composite material in a mold while other portions of composite material in the mold are constrained. For example, some embodiments described herein include methods of compressing a section of composite material with a piston while constraining another section of composite material with a fixed member such as another piston or a cover block.

Binder content affects the cost of cements. For example, polymer cements typically cost about $200 per ton to produce, of which greater than 60% of this cost is that of the binder. Yearly carbon dioxide emissions from the manufacture of polymer cement is estimated at about 450 kg per ton of polymer cement produced. Lim et al., 2019 *Environ. Res. Lett.* 14 114014 reports that global annual concrete consumption stands at 10 billion $m^3$, or 25 billion tons, which makes it the most utilized engineered material around the world. Concrete consumption is expected to increase by 12%-23% by 2050 compared to 2014. The binder content of the composite material used in the generation of concrete is the biggest contributor to $CO_2$ emissions.

Reducing binder content can decrease environmental impact and increase efficiency through cost reduction. Some embodiments described herein provide materials, methods, and systems that pertain to composite materials prepared using pressure-aided self-assembly (PASA) or compaction self-assembly (CSA) techniques. For example, units of a filler material are combined with a binder material to form a mixture, with or without a mechanical mixing step, in which the amount of binder material is low. A relatively high pressure (>0.5 atmosphere) is applied to the mixture to spread the binder material among the units of the filler material to form a solid, integral composite material. In an optional step, the composite material can then be set or cured.

In some example embodiments, compaction is performed section by section to produce large parts. Various embodiments described herein facilitate production of large parts by using cost-efficient machinery, such as mechanical press and hydraulic jacks. In some examples, large parts can be are larger than 2 cm, and have a mass larger than 5 g.

To manufacture large parts, a portion of the composite material area is compressed while the other areas are constrained. In this fashion, the maximum force for compaction can be reduced. For example, a compaction pressure of 100 MPa over a compressible area of 1 $m^2$ can be facilitated by compaction of 100 sections with a relatively low compaction force of 1,000 kN (e.g., compared to a 100,000 kN of force for one step compaction).

Some embodiments of the devices, systems, and techniques described herein may provide one or more of the following advantages. First, some embodiments described herein facilitate the production of precast parts. Using precast parts can reduce the duration of construction projects and can simplify construction procedures. Precast parts can be made at a location that is different from the construction location where the part will be installed and/or implemented. For example, sectioned compaction can generate precast large parts in an off-site location which can be transported as a complete part to the construction location. In some incidences, the precast part can be created indoors in a climate controlled environment, which can increase efficiency by reducing climate related variations in ambient conditions.

Second, some embodiments described herein facilitate the production of large parts with reduced binder content. The sectioned compaction of large parts described herein can yield composite materials which provide relatively high flexural strength, compressive strength, and/or other advantageous mechanical and functional properties, while utilizing less binder. In some embodiments, reduced binder content can increase the cost efficiency of construction products.

Third, some embodiments described herein facilitate a decrease in environmental impact. For example, a reduced binder content can decrease the environmental impact associated with emitted gases during manufacturing/curing. Some embodiments described herein utilize sectioned compaction techniques which produce large parts that include a reduced binder content and maintain flexural and compressive strength comparable to products with a larger amount of binder content.

Fourth, some embodiments described herein facilitate cost-efficient production of structural and/or functional large parts by the use of cost-efficient machinery. For example, some embodiments described herein generate large parts by employing sectioned compaction techniques that constrict a portion of composite material while compressing a different portion of composite material. Cost-efficient and/or familiar machinery such as a mechanical press and a hydraulic jack can be employed to execute the sectioned compaction of large parts.

Fifth, some embodiments described herein facilitate a reduction in energy for the production of structural and/or functional large parts by the use of section by section compression techniques. For example, during the manufacture large parts, a portion of the composite material area can be compressed while the other areas are constrained. In this fashion, the maximum force and energy for compaction is reduced. For example, if the compaction pressure is 100 MPa ($100,000,000$ N/m$^2$) and the compressible area is 1 m$^2$, 100,000 kN of force for one step compaction. If the compaction is completed in 100 sections, for each section the compaction force needs to be only 1,000 kN.

In one aspect, compaction systems disclosed herein can include a mold assembly, including a bottom wall, one or more side walls coupled to the bottom wall, one or more pistons, wherein the bottom wall, the one or more side walls, and the one or more pistons at least partially define a mold cavity, and wherein each of the one or more pistons are independently movable to reduce a volume of the mold cavity; and a plurality of fasteners configured to selectively immobilize the one or more pistons; and a compression actuator configured to sequentially advance the pistons from an initial position to an actuated position to compress a composite material within the mold cavity.

In some embodiments, the one or more side walls form a rectangle In some embodiments, the one or more side walls form a cylinder. In some embodiments, the compaction system can include a grate having a plurality of apertures. In some embodiments, the one or more pistons traverse the grate via the plurality of apertures.

In some embodiments, the compression actuator is selected from the group consisting of a mechanical press, a hydraulic jack, and a roller. In some embodiments, the one or more voids are cylindrical. In some embodiments, the one or more voids are rectangular. In some embodiments, the one or more pistons include a first piston movable linearly along a first axis and a second piston movable linearly along a second axis, the first axis parallel to the second axis and spaced a fixed distance from the second axis during actuating of the first piston. In some embodiments, a first fastener of the plurality of fasteners immobilizes the first piston in the initial position. In some embodiments, a second fastener immobilizes the first piston in a second position when actuated.

In some embodiments, the composite material comprises a filler and a binder and wherein the filler is one or more of sand, soil, rocks, gravel, stones, bricks, concrete, cement, wood, metals, alloys, ceramics, polymers, glasses, carbon material, solid waste, or biomass.

In some embodiments, the binder is one or more of thermoplastic materials, thermosetting materials, elastomeric materials, polymer materials, ceramic materials, cements, glasses, carbon materials, metals, alloys, salts, and sulfur-containing materials.

In another aspect, described herein are methods for the compaction of composite material, the method including immobilizing a first piston over a first portion of composite material, positioning a second piston over a second portion of the composite material, applying pressure to the second piston positioned over the second portion of composite material via a compression actuator, mobilizing the first piston over the first portion of the composite material, and applying pressure to the first piston positioned over the first portion of composite material via the compression actuator.

In some embodiments, the method can include, prior to immobilizing a first piston over a first portion of composite material, applying pressure to the first piston and the second piston at a first force of 10 kips to 30 kips, via the compression actuator. In some embodiments, the method can include, applying pressure to the second piston compresses the second portion of the composite material at a second force of about 10 kips to 20 kips.

In some embodiments, the method can include, applying pressure to the first piston positioned over the first portion of composite material via the compression actuator, immobilizing the second piston.

In some embodiments, the mass of the composite material formed is about 5 g or greater. In some embodiments, a dimension of the composite material formed is about 2 cm or greater.

Ins embodiments, the method can further include removing the first portion of composite material and the second portion of composite material, inverting the first portion of composite material, inverting the second portion of composite material, applying pressure to the first piston and the second piston compressing the inverted the first portion and the inverted second portion at the first force of 10 kips to 30 kips, via the compression actuator, immobilizing the first piston; and applying pressure to the second piston to compress the inverted second portion of the composite material at the second force of 10 kips to 20 kips.

In another aspect, described herein are methods for the compaction of composite material, the method including immobilizing a cover block over a first portion of composite material, positioning a piston over a second portion of the composite material, applying pressure, via a compression actuator, to the piston positioned over the second portion of composite material, moving the cover block over a third portion of the composite material, positioning the piston over the first portion of the composite material, and applying pressure to the piston positioned over the first portion of composite material via the compression actuator.

In some embodiments, the cover block applies pressure at a first force onto the first portion of the composite material. In some embodiments, the pressure applied to the piston by the compression actuator is at a second force greater than the first force.

The details of one or more embodiments are set forth in the accompanying drawings and the description below. Other features will be apparent from the description, drawings, and claims.

DESCRIPTION OF DRAWINGS

FIG. 5 shows a schematic diagram showing redistribution of a binder material from interstitial gaps between filler material particles to regions of contact between the filler material particles during application of pressure to a mixture of binder and filler materials.

FIG. 6A shows an example of a compressed 1 lb sample.

FIG. 6B shows an example of a compressed cubic sample.

FIG. 6C shows an example of a beam sample.

FIG. 11A shows a perspective view of an example cylindrical compaction system.

FIG. 11B shows an exploded view of the example cylindrical compaction system of FIG. 11A.

FIG. 12A shows an example of a sectioned compaction path of a cylindrical compaction system.

FIG. 12B shows a perspective view of the cylindrical compaction system of claim 12A where a center section has been compacted.

FIG. 12C shows a perspective view of the cylindrical compaction system of FIG. 12A where a subsequent section has been compacted.

FIG. 13A shows an example of bottom ash (BA) without alteration.

FIG. 13B shows an example of bottom ash (BA) after oven drying.

FIG. 13C shows an example of fly ash (FA) without alteration.

FIG. 14A shows an example of the bottom ash (BA) and the fly ash (FA) before pre-mixing.

FIG. 14B shows an example of the bottom ash (BA) and the fly ash (FA) after pre-mixing.

FIG. 14C shows an example of the bottom ash (BA) and the fly ash (FA) having the addition of alkaline activator (AA).

FIG. 15A shows a top view of an example cured sample.

FIG. 15B shows a cross-section of an example cured sample.

FIG. 16A shows flexural strength results from the samples tested as outlined in Table 7.

FIG. 16B shows an example flexural strain curve.

FIG. 17A shows an example of air dried sand.

FIG. 17B shows an example of air dried sand having 4% epoxy binder.

FIG. 17C shows an example of pre-mixed sand and epoxy.

FIG. 17D shows a cured sample of sand and epoxy

FIG. 17E shows a cross-section exposing the interior of cured sand and epoxy.

FIG. 19 shows a schematic of the sectioned compaction self-assembly (CSA).

FIG. 20A shows flexural strength measurement results for various locations of the sample.

FIG. 20B shows an example of a typical flexural strain curve.

FIG. 22 shows a flow diagram of an example method of sectioned compaction.

FIG. 23 shows a flow diagram of an example method of sectioned compaction.

DETAILED DESCRIPTION

Figure 1A:
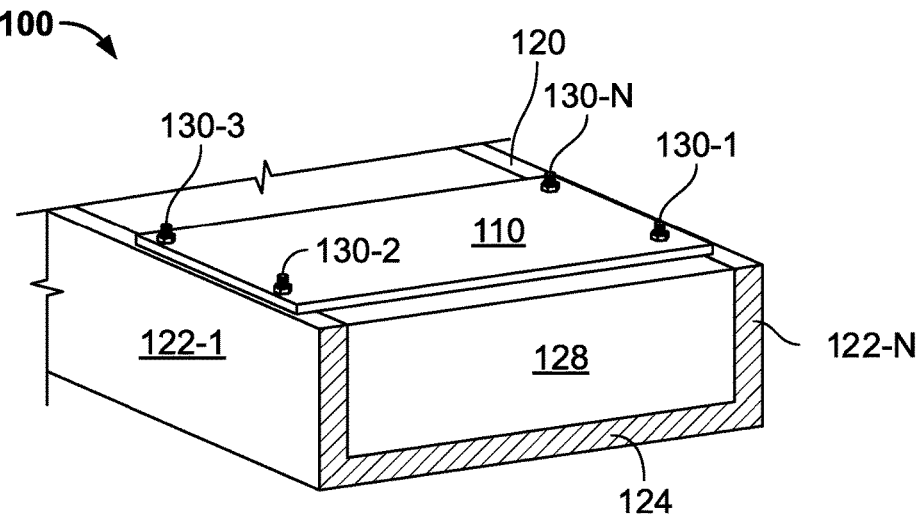
FIG. 1A shows a cross-section view of an example compaction system having a cover block.
Figure 1B:
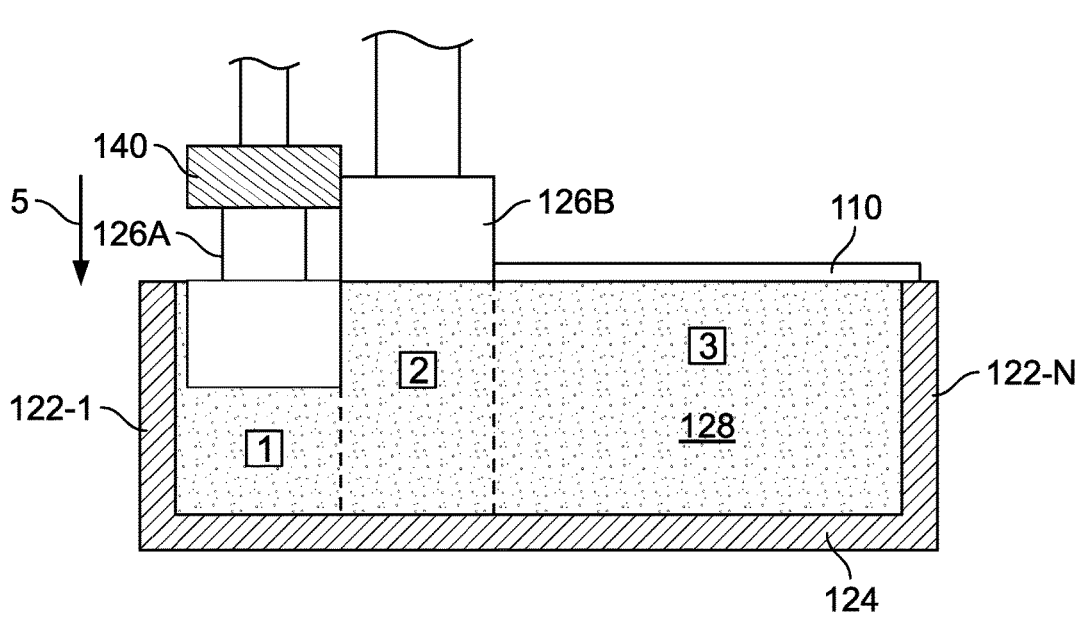
FIG. 1B shows a cross-section of the example compaction system of FIG. 1A.

FIGS. 1A and 1B show an example compaction system 100. The compaction system 100 includes a cover block 110, a mold assembly 120, and one or more compression members 126. The mold assembly 120 includes side walls 122-1, 122-N (which can be collectively referred to herein as side walls 122) and a bottom wall 124. The bottom wall 124 and the side walls 122 define a mold cavity 128. The compaction system 100 includes one or more fasteners 130-1, 130-2, 130-3, 130-N which can be collectively referred to herein as fasteners 130. The fasteners 130 secure the cover block 110 in place (e.g., during compaction of material within the mold cavity).

FIG. 1B is a cross-section of compaction system 100 including cover block 110, mold assembly 120, and compression members 126. In various example embodiments, the compression member 126 is a movable structure/actuator that is actuated to reduce the volume of the area of the mold cavity 128. For example, compaction system 100 includes one or more compression members that include pistons 126. The compaction system 100 can include a compression actuator 140 (e.g., a mechanical press, a hydraulic jack, and/or a roller) that applies pressure to the one or more pistons 126. The compression actuator 140 applies pressure to the one or more pistons 126 such that the piston 126 transfers the load to a section of the composite material.

Referring still to FIG. 1B, an example of sectioned compaction of a composite material to manufacture large parts is shown. Sections of the composite material within the mold cavity 128 are compressed in sections while other portions of the composite material are constrained. In this fashion, the maximum force (e.g., delivered by actuator 140)

for compaction is reduced (e.g., as compared to simultaneous compaction of the entire composite material within mold cavity 128). In an example configuration, a first piston 126A is in a first position which compresses composite material in a first area 1 (e.g., under the piston 126A). The composite material in area 1 has been compacted via the piston 126A transferring the load applied by compression actuator 140 to the piston 126A illustrated by an arrow 5. The cover block 110 is secured to the mold assembly 120 by fasteners 130 (see FIG. 1A). The cover block 110 constrains composite material (designated by the number 3) while piston 126A compresses the composite material in the first area.

In an example configuration, piston 126B has not yet been compressed by the compression actuator 140. For example, the piston 126B is in an initial or un-advanced position. The composite material in area 2 has not been compacted via the piston 126B transferring the load applied by compression actuator 140. In this way, a second section (area 2) will be compacted following the compaction of a first area (area 1), while a third area (area 3) is constrained by cover block 110. In some embodiments, piston 126B is immobilized or otherwise fixed to constrain the composite material in area 2 (e.g., while the composite material in area 1 is compacted by the piston 126A.

A large part can have a mass of 2 g to 500 g. In some examples, the large part has a mass of 50 g to 500 g, 100 g to 500 g, 150 g to 500 g, 200 g to 500 g, 250 g to 500 g, 300 g to 500 g, 350 g to 500 g, 400 g to 500 g, 450 g to 500 g. In some example embodiments, a large part has a mass of 0.5 lbs. to 2000 lbs. In some examples, a large part has a mass of 20 lbs. to 2000 lbs., 50 lbs. to 2000 lbs., 100 lbs. to 2000 lbs., 200 lbs. to 2000 lbs., 300 lbs. to 2000 lbs., 400 lbs. to 2000 lbs., 500 lbs. to 2000 lbs., 600 lbs. to 2000 lbs., 700 lbs. to 2000 lbs., 800 lbs. to 2000 lbs., 900 lbs. to 2000 lbs., 1000 lbs. to 2000 lbs., 1100 lbs. to 2000 lbs., 1200 lbs. to 2000 lbs., 1300 lbs. to 2000 lbs., 1400 lbs. to 2000 lbs., 1500 lbs. to 2000 lbs., 1600 lbs. to 2000 lbs., 1700 lbs. to 2000 lbs., 1800 lbs. to 2000 lbs., or 1900 lbs. to 2000 lbs.

In some example embodiments, the cover block 110 is moved to expose the third section (area 3) of the composite material. The piston 126 can be moved to the third area of the composite material in the mold cavity 128 such that pressure is applied to the piston 126 and the load is transferred to a portion of the composite material in area 3.

The cover block 110 is made of a material that is resistant to warping or deformation. For example, cover block 110 can be made from steel, ceramic, iron, tungsten, chromium, titanium, other metals, wood, composite materials, or other rigid materials. In some example embodiments, the cover block 110 is about 0.5 inches thick to about 24 inches thick. For example, the cover block 110 is 0.5 inches thick to 24 inches thick, 1.0 inch thick to 24 inches thick, 2 inches thick to 24 inches thick, 3 inches thick to 24 inches thick, 4 inches thick to 24 inches thick, 5 inches thick to 24 inches thick, 6 inches thick to 24 inches thick, 7 inches thick to 24 inches thick, 8 inches thick to 24 inches thick, 9 inches thick to 24 inches thick, 10 inches thick to 24 inches thick, 11 inches thick to 24 inches thick, 12 inches thick to 24 inches thick, 13 inches thick to 24 inches thick, 14 inches thick to 24 inches thick, 15 inches thick to 24 inches thick, 16 inches thick to 24 inches thick, 17 inches thick to 24 inches thick, 18 inches thick to 24 inches thick, 19 inches thick to 24 inches thick, 20 inches thick to 24 inches thick, 21 inches thick to 24 inches thick, 22 inches thick to 24 inches thick, or 23 inches thick to 24 inches thick. In some embodiments, the thickness of the cover block 110 is about 2 inches to about 6 inches. The cover block 110 is any shape that fits the area to be constrained. For example, the dimensions can form a square, a rectangle, a triangle, a trapezoid, a circle, an oval, etc. The dimensions (length or width) of the cover block 110 is 1 foot to 20 feet, 2 feet to 20 feet, 3 feet to 20 feet, 4 feet to 20 feet, 5 feet to 20 feet, 6 feet to 20 feet, 7 feet to 20 feet, 8 feet to 20 feet, 9 feet to 20 feet, 10 feet to 20 feet, 11 feet to 20 feet, 12 feet to 20 feet, 13 feet to 20 feet, 14 feet to 20 feet, 15 feet to 20 feet, 16 feet to 20 feet, 17 feet to 20 feet, 18 feet to 20 feet, or 19 feet to 20 feet.

The mold assembly 120 is in the form a square, a rectangle, a triangle, a trapezoid, a circle, and an oval. The mold assembly 120 defines a mold cavity 128. The dimensions of the mold cavity are defined at least partially by the one or more side walls 122 and the bottom wall 124. In various example embodiments, the dimensions (length, width, circumference, etc.) of the one or more side walls 122 and the bottom wall 124 is 1 inch to 12 inches, 2 inches to 12 inches, 3 inches to 12 inches, 4 inches to 12 inches, 5 inches to 12 inches, 6 inches to 12 inches, 7 inches to 12 inches, 8 inches to 12 inches, 9 inches to 12 inches, 10 inches to 12 inches, or 11 inches to 12 inches. The one or more side walls 122 and the bottom wall 124 is 1 inch to 12 inches facilitate the sectioned compaction generation of large parts.

In some example embodiments, one or more side walls 122 and/or bottom wall 124 has dimensions (length, width, or circumference) in a range from 1 inches to 12 inches to 100 feet, 2 feet to 100 feet, 4 feet to 100 feet, 5 feet to 100 feet, 10 feet to 100 feet, 15 feet to 100 feet, 20 feet to 100 feet, 25 feet to 100 feet, 30 feet to 100 feet, 35 feet to 100 feet, 40 feet to 100 feet, 45 feet to 100 feet, 50 feet to 100 feet, 55 feet to 100 feet, 60 feet to 100 feet, 65 feet to 100 feet, 70 feet to 100 feet, 75 feet to 100 feet, 80 feet to 100 feet, 85 feet to 100 feet, 90 feet to 100 feet, or 95 feet to 100 feet. For example, the one or more side walls 122 and the bottom wall 124 is 12 inches to 100 feet facilitate the creation of large parts while reducing the amount of force. For example, for a large part a portion of the material area is compressed while the other areas are constrained. In this fashion, the maximum force for compaction is reduced. In this way, a large amount of force can be applied sequentially over an area. For example, 100 MPa (100,000,000 N/m$^2$ can be applied sequentially over an area (e.g., 1 m$^2$) to provide a predetermined compaction pressure. Said differently, if the compaction pressure is 100 MPa (100,000,000 N/m$^2$) and the compressible area is 1 m$^2$, 100,000 kN of force can be applied section by section over the 1 m$^2$ area.

The one or more side walls 122 can form various shapes. In some examples embodiments, the one or more side walls form a square, a rectangle, a cylinder, an ellipsis, an oval, or an irregular shape. In some embodiments, the shape formed by the one or more side walls is symmetrical. In some embodiments, the shape formed by the one or more side walls is non-symmetrical.

Some compaction system can include removable components that can generate hollow portions of the large part. For example, sliding parts can be used with one or more side walls 122 to form hollow sections within the mold cavity 128. In some embodiments, a sliding part is selectively used with the one or more side walls 122 to displace composite material in the generation of large parts. For example, a sliding part can be positioned within the mold cavity 128 to displace composite material that is compressed in areas surrounding the sliding part. A sliding part, in some embodiments, couples to the one or more side walls 122 having a tongue-and-groove configuration such that the sliding part can be selectively added and removed from the compaction system 100. For example, a sliding part can be coupled to the one or more side walls 122 prior to the addition of composite material to the mold cavity 128. In this example, once the composite material has been added to the mold cavity and compressed, the sliding can be removed, generating a hollow portion within the mold cavity 128.

In some embodiments, the sliding part can be positioned on the bottom wall 124. For example, the sliding part can be positioned on the bottom wall 124 such that the sliding part is perpendicular to the bottom wall 124. In some example embodiments, more than one sliding part can be included in the compaction system 100. For example, a plurality of sliding parts can be positioned on the bottom wall 128 prior to the addition compaction material and removed after the compression of compaction material, generating a plurality of hollow portions within the mold cavity 128.

In some example embodiments, the thickness of the one or more side walls 122 is 0.5 inches thick to 24 inches thick, 1.0 inch thick to 24 inches thick, 2 inches thick to 24 inches thick, 3 inches thick to 24 inches thick, 4 inches thick to 24 inches thick, 5 inches thick to 24 inches thick, 6 inches thick to 24 inches thick, 7 inches thick to 24 inches thick, 8 inches thick to 24 inches thick, 9 inches thick to 24 inches thick, 10 inches thick to 24 inches thick, 11 inches thick to 24 inches thick, 12 inches thick to 24 inches thick, 13 inches thick to 24 inches thick, 14 inches thick to 24 inches thick, 15 inches thick to 24 inches thick, 16 inches thick to 24 inches thick, 17 inches thick to 24 inches thick, 18 inches thick to 24 inches thick, 19 inches thick to 24 inches thick, 20 inches thick to 24 inches thick, 21 inches thick to 24 inches thick, 22 inches thick to 24 inches thick, or 23 inches thick to 24 inches thick.

The compression actuator 140 transfers a load to a piston 126 during operation. In some embodiments, the load is 5 kips to 100 kips, 10 kips to 100 kips, 15 kips to 100 kips, 20 kips to 100 kips, 25 kips to 100 kips, 30 kips to 100 kips, 35 kips to 100 kips, 40 kips to 100 kips, 45 kips to 100 kips, 50 kips to 100 kips, 55 kips to 100 kips, 60 kips to 100 kips, 65 kips to 100 kips, 70 kips to 100 kips, 75 kips to 100 kips, 80 kips to 100 kips, 85 kips to 100 kips, 90 kips to 100 kips, or 95 kips to 100 kips. In some embodiments, the peak applied pressure is at least 10 MPa, for example, at least 20 MPa, at least 30 MPa, at least 40 MPa, at least 50 MPa, at least 70 MPa, at least 100 MPa, at least 150 MPa, at least 200 MPa, at least 250 MPa, at least 300 MPa, at least 350 MPa, at least 400 MPa, at least 500 MPa.

The compression actuator 140 transfers a load to a piston 126 of about 20 kN 10 150 kN. In some embodiments, the compressor actuator 140 transfers a load of about 25 kN to about 150 kN, 30 kN to about 150 kN, 35 kN to about 150 kN, 40 kN to about 150 kN, 45 kN to about 150 kN, 50 kN to about 150 kN, 55 kN to about 150 kN, 60 kN to about 150 kN, 65 kN to about 150 kN, 70 kN to about 150 kN, 75 kN to about 150 kN, 80 kN to about 150 kN, 85 kN to about 150 kN, 90 kN to about 150 kN, 95 kN to about 150 kN, 100 kN to about 150 kN, 105 kN to about 150 kN, 110 kN to about 150 kN, 115 kN to about 150 kN, 120 kN to about 125 kN, 130 kN to about 150 kN, 135 kN to about 150 kN, 140 kN to about 150 kN, or 145 kN to about 150 kN.

In some embodiments, the duration over which the peak pressure is applied is at least 1 second, for example, at least 2 seconds, at least 5 seconds, at least 10 seconds, at least 30 seconds, at least 1 minute, at least 2 minutes, at least 5 minutes, at least 10 minutes, at least 20 minutes, at least 30 minutes, at least 1 hour, at least 2 hours, at least 4 hours, at least 6 hours, at least 12 hours, at least 1 day, at least 2 days, or at least 3 days. For example, the load transferred from the compression actuator 140 to the one or more pistons 126 reduces the volume of mold cavity 128 during section compression of large parts.

The one or more pistons 126 includes a structure that, when actuated reduces the volume of the mold cavity 128. In various example embodiments, the piston 126 includes a bar, a rod that can transfer the load from the compression actuator 140 to a section of composite material within the mold cavity 128. In embodiments where a compaction system includes one or more pistons, the pistons move independent of each other along an axis. For example, a first piston is positioned on an axis that is parallel to a second piston on another axis that is parallel to the axis of the first piston. In some embodiments, the first axis is parallel to the second axis and spaced a fixed distance from the second axis during actuating of the first piston. In this way, one or more of the pistons are actuated at a time to provide the sectioned compaction of the composite material to generate large parts.

The fasteners 130 are anything that selectively immobilizes one or more components of the compaction system 100. For example, a fastener is a clamp, a screw, a vice, a pin, a rivet, a bolt, a carriage bolt, an eye bolt, a U-bolt, glue, welded metal, caulk, or a polymer based material.

The composite material can be uniform or non-uniform. For example, in certain composite materials, the distribution of a binder material within the composite material is non-uniform. For example, different amounts of binder and filler can be used to make up various formulations of composite material. In some embodiments, during the compaction of large parts, different formulations of composite material can be used to create a large part. For example, a first formulation of composite material and a second formulation of composite material can be used within a compaction system 100 to formulate a non-uniform large part. Such materials can include distinct regions in which the binder material distribution or concentration is constant, but where the binder distribution or concentration differs among at least some of the regions. In some examples, the distribution or concentration of the binder material varies continuously from one location to another within the material. In some examples, the binder content in some areas can be zero.

Similar considerations can apply to filler materials in some embodiments. In certain composite materials, the distribution of a filler material is non-uniform. The concentration or distribution of the filler material can vary in step-wise fashion between different regions of the composite material, or in a smoothly varying continuous or semi-continuous fashion through the composite material. For example, the filler material can be sand, soil, carbon, polymers, metals, alloys, ceramics, composites, elastomers, glass, or any combination thereof.

Figure 2A:
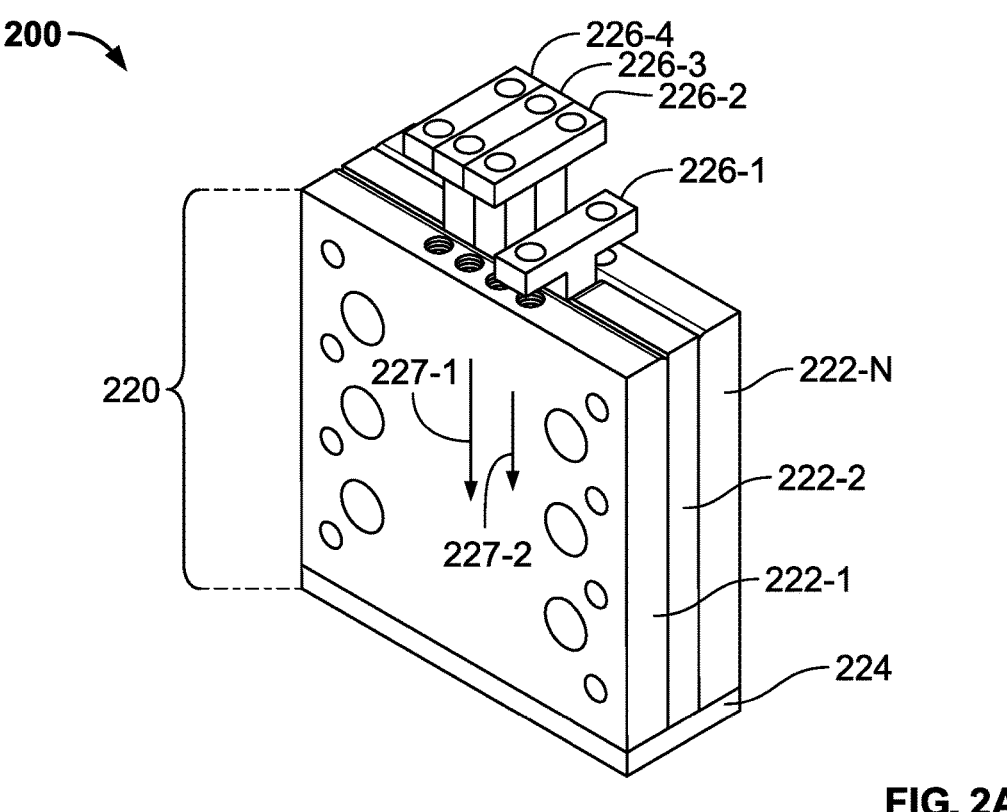
FIG. 2A shows a perspective view of an example compaction system having a plurality of pistons.
Figure 2B:
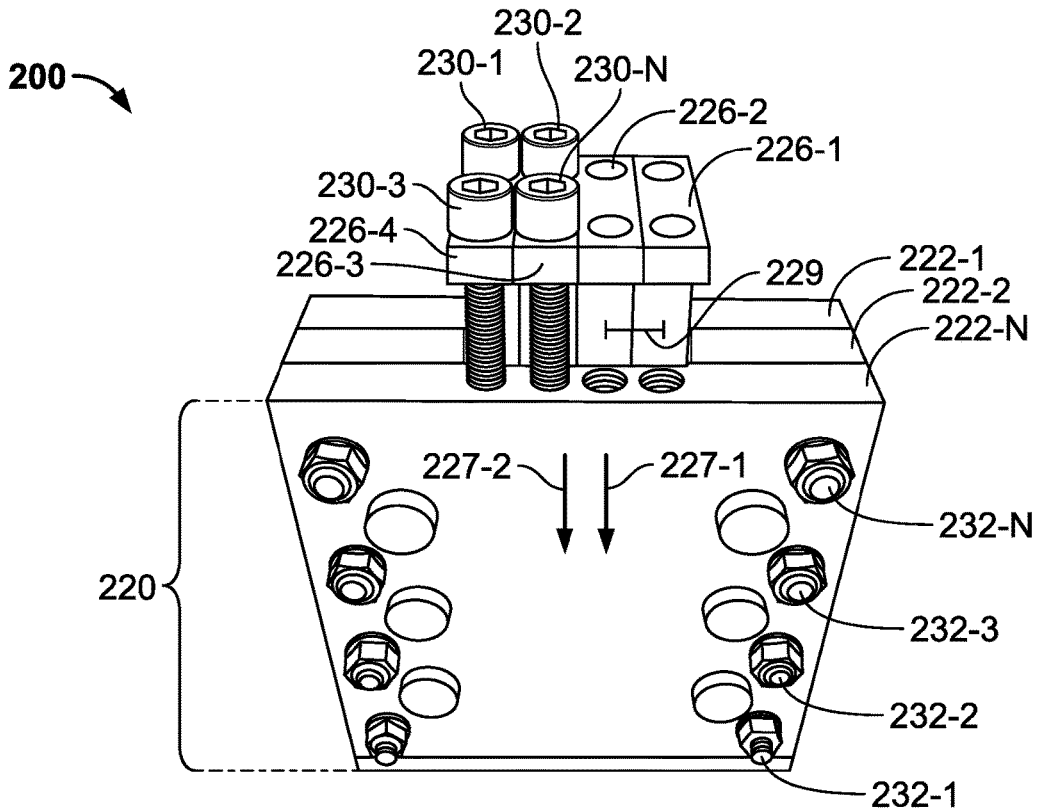
FIG. 2B shows a perspective view of the example compaction system of FIG. 2A.

Referring now to FIGS. 2A and 2B, perspective views of an example compaction system 200 including a plurality of pistons in a first configuration (FIG. 2A) and a second configuration (FIG. 2B) are shown. In an example embodiment, the compaction system 200 includes one or more features of the compaction system 100 described above with reference to FIGS. 1A and 1B.

The compaction system 200 includes one or more pistons 226-1, 226-2, 226-3, and 226-4. Each piston 226-1, 226-2, 226-3, and 226-4 is moveable linearly along a respective axis. For example, a first piston 226-1 is movable linearly along a first axis (depicted by arrow 227-1) and a second piston 226-2 movable linearly along a second axis (depicted by arrow 227-2), the first axis 227-1 parallel to the second axis and spaced a fixed distance 229 from the second axis 227-2 during actuation.

The compaction system 200 includes a mold assembly 220 including one or more side walls 222-1, 222-2, 222-N and a bottom wall 224 that form a mold cavity to which the pistons 228 are inserted. FIG. 2B illustrates side walls that are coupled together by locking bars 232-1, 232-2, 232-3, 232-N. The locking bars include a nut and bolt, a screw and washer, a screw, a bolt, and/or a pin. Alternatively or additionally, one or more side walls are integrally joined (e.g., machined from a single block of material, and do not include locking bars or other couplers.

The compaction system 200 shows an example of sectioned compaction to create large parts. The sectioned compaction can be used to generate precast large parts. In some example embodiments, the compaction is performed section by section using cost efficient machinery such as pistons 226 and fasteners 230. FIG. 2B shows fasteners 230 selectively immobilizing pistons 226-3 and 226-4 and not immobilizing pistons 226-1 and 226-2. For example, the immobilized pistons 226-3 and 226-4 are immobilized before and/or after being actuated. The pistons 226 are actuated by a compression actuator. For example, pistons 226-1 and 226-2 not immobilized by fasteners 230 are actuated (e.g., sequentially) to apply pressure to a composite material within the mold assembly 220. Sectioned compaction can be accomplished by compressing the one or more pistons while immobilizing one or more pistons.

Figures 3, 4A, 4B:
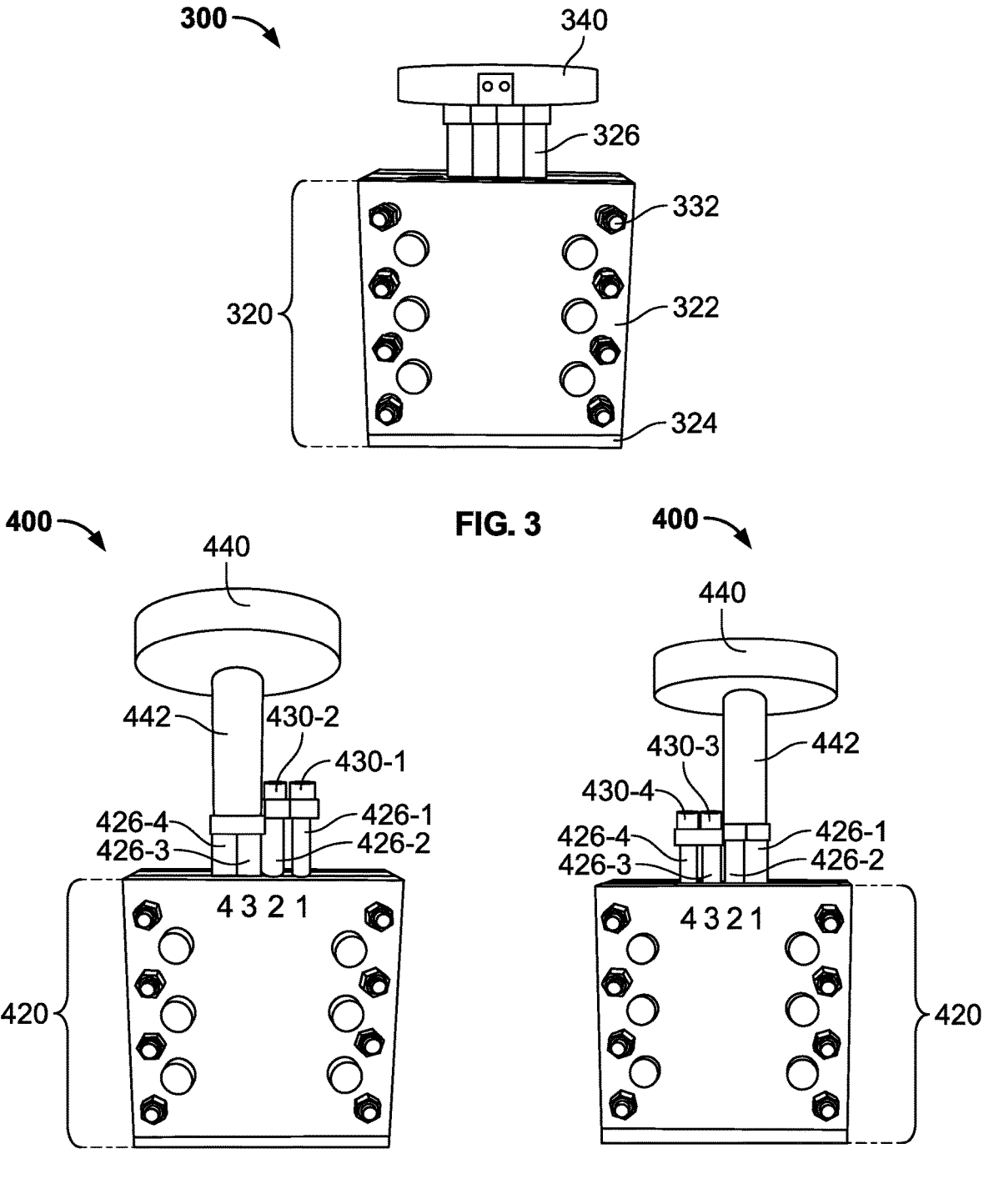
FIG. 3 shows a perspective view of an example compaction system having four pistons being compacted.
FIG. 4A shows a perspective view of an example compaction system in a first configuration.
FIG. 4B shows a perspective view of the example compaction system of FIG. 4A in a second configuration.

FIG. 3 is a perspective view of an example compaction system having four pistons being compacted. In an example embodiment, the compaction system 300 includes one or more features of the compaction systems 100 and 200 described above with reference to FIGS. 1A, 1B, 2A, and 2B. Compaction system 300 includes one or more pistons 326 which are being simultaneously compacted by compression member 340. The mold assembly 320 includes one or more side walls 322 and a bottom wall 324 that are coupled together with locking bars 332. The pistons 326 can be actuated together, one-by-one, or more than one at a time. For example, the pistons 326 can be actuated together by compression actuator 340 as an initial step to the generation of a large part. This may provide the advantage of having the composite material beneath of all of the pistons 326 at the same initial compressive force. In some examples, more than one piston 326 can be compressed in a given instance while the remaining pistons are immobilized. This procedure is described in connection with Example 1.

FIG. 4A is a perspective view of a sectioned compaction 400 in a first configuration. FIG. 4B is a perspective view of an example sectioned compaction system 400 in a second configuration. In an example embodiment, the compaction system 400 includes one or more features of the compaction system 100, 200, and 300 described above with reference to FIGS. 1A, 1B, 2A, 2B, 3, 4A, and 4B.

Compaction system 400 shows the sectioned compaction of large parts where a portion of the material in compressed while other portions are constrained. For example, FIG. 4A shows mold assembly 420 including pistons 426-1 and 426-2 immobilized by fasteners 430-1 and 430-2. In this example embodiment, pistons 426-4 and 426-3 are compressed by compression actuator 440 including extension bar 442. Extension bar 442 is an optional component to the compression actuator 440. In some examples, extension bar 442 has a circumference that is less than that of compression actuator 440. Extension bar 442 applies even compressive load to one or more pistons 426. FIG. 4B shows mold assembly 420 including pistons 426-3 and 426-4 immobilized by fasteners 430-3 and 430-4. In this example embodiment, the pistons 426-3 and 426-4 are immobilized after having been compressed as described in connection with FIG. 4A. In the example embodiment of FIG. 4B, pistons 426-1 and 426-2 are compressed by compression actuator 440 including extension bar 442 to the same level as pistons 426-3 and 426-4. In some embodiments, the sectioned compaction of large parts described in connection with FIGS. 4A and 4B are executed after compression as described in connection with FIG. 3. This embodiment is described in connection with Example 2.

Methods of fabricating the composite materials disclosed herein involve the application of relatively high pressures to mixtures of filler and binder materials. Binder material is a material or substance that contacts units of a filler material (e.g., grains, particles, fibers, and/or other individual structural entities) and holds the units of the filler material together to form a solid, integral composite material. A variety of different substances can be used as binder materials, including for example thermoplastic materials, thermosetting materials, elastomeric materials, polymer materials (e.g., polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates), ceramic materials, glasses, metals, alloys, salts, carbon materials, biomass, composites, and/or sulfur-containing materials.

Filler material is a material or substance that forms a majority (by percentage weight and/or by percentage volume) of a composite material, effectively constituting a major portion of the bulk structure of the composite material. A variety of different substances can be used as filler materials, including for example sand, soil, rocks, gravel, stones, bricks, metals, alloys, ceramics, polymers, elastomeric materials, thermosetting materials, thermoplastic materials, composites, glasses, solid waste (e.g., recycled waste), carbon materials, biomass, medicine, food, electrode materials, and/or any components of these materials. In some examples the filler is biomass (e.g., wood, crops, seaweed, and animal waste).

In various example embodiments, applying such high pressures assists both the close packing of the filler material and the location of the binder material. The application of pressure deforms and/or crushes the filler material into particles of varying size. The crushed filler material forms a denser, close-packed structure, reducing the interstitial gap volume. As the filler material units are compressed, the binder material is squeezed out of the interstitial sites and spread over the filler material unit surfaces. Capillary forces draw the binder material into the narrowest spaces to form microagglomerations at locations where the filler material units are close to one another.

FIG. 5 is a schematic diagram showing redistribution of a binder material from interstitial gaps between filler material particles to regions of contact between the filler material particles during application of pressure to a mixture of binder and filler materials. For example, binder material 580 moves from the interstitial gaps 586 to contact regions 584 between the units of filler material particles 582 when pressure is applied to the binder and filler materials. This process reduces the amount of binder material used in the composite material while increasing the fraction of binder material that is utilized to carry mechanical loads within the composite material structure. As a result, the composite material can be fabricated at reduced cost (e.g., due to the smaller amount of binder material used), while still achieving high material performance, due to the binder material functioning within the composite structure.

Example precast large parts made by sectioned compaction having low binder composite material are shown in FIGS. 6A, 6B, and 6C. FIG. 6A shows an example of a compressed 1 lb. sample that is about 3.75 inches long. FIG. 6B shows an example of a compressed cubic sample that is about 0.75 inches×0.75 inches×0.75 inches. FIG. 6C shows an example of a beam sample that is about 0.75 inches long.

Different sections of materials are added and processed in sectioned compaction in an additive manufacturing or three-dimensional process (i.e., a portion of material can be added, compressed, and/or cured, before next portion of material is added and processed). In some embodiments, composite materials of different formulations are utilized in the creation of a large part. For example, dry sand is utilized without a binder to create hollow areas or other shapes in section compression creation. FIGS. 7A, 7B, 8, 9, and Example 3 describe this process, for example.

Figures 7A, 7B:
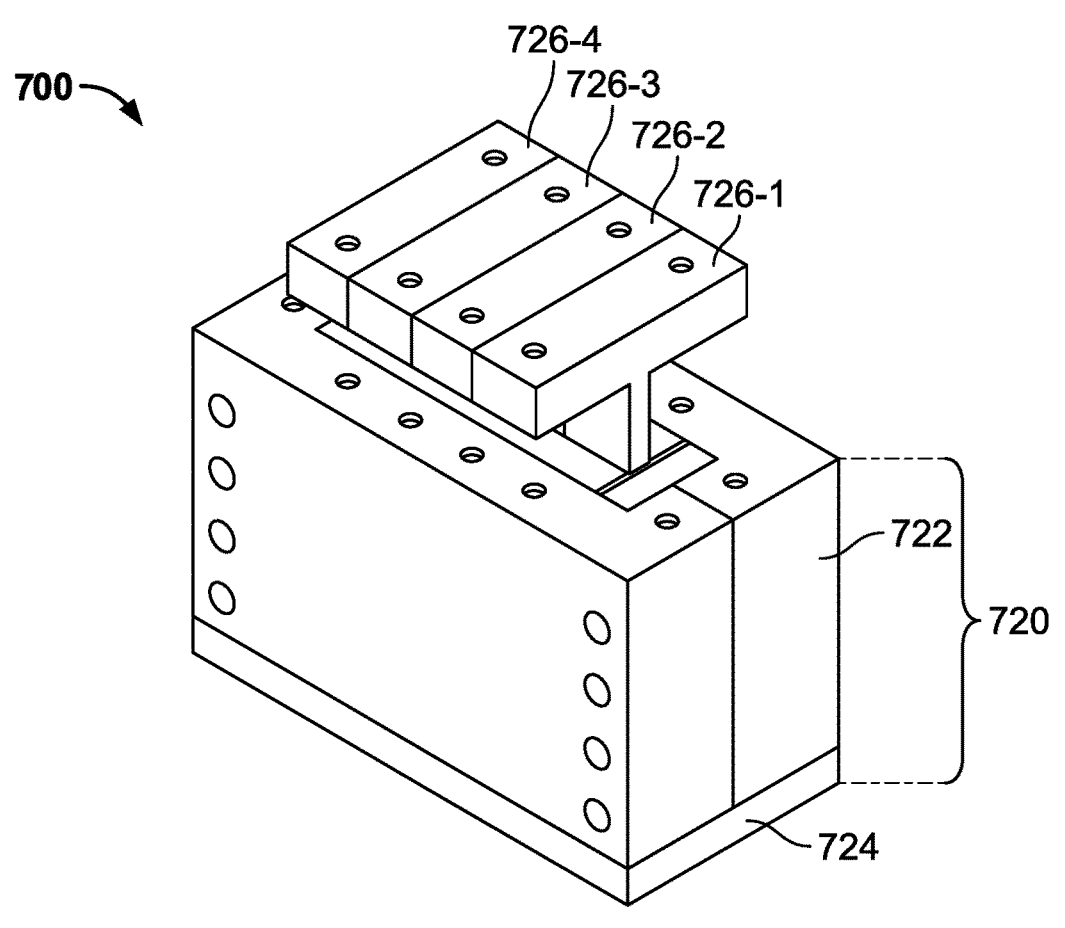
FIG. 7A shows an example compaction system having a U-shaped walls.
FIG. 7B shows the compaction system of FIG. 7A having a compression actuator.

Referring now to FIGS. 7A and 7B are perspective views of an example compaction system 700 having U-shaped walls. Compression system 700, is the compaction system of FIG. 7A having a compression actuator. Compaction system 700 shows the U-shaped mold assembly 720 includes one or more side walls 722 and a bottom wall 724 that are coupled together with locking bars 732. For example, the pistons 726-1, 726-2, 726-3, and 726-4 are actuated together by compression actuator 740 as an initial step to the generation of a large part. This procedure is described in connection with Example 3.

Figures 8, 9:
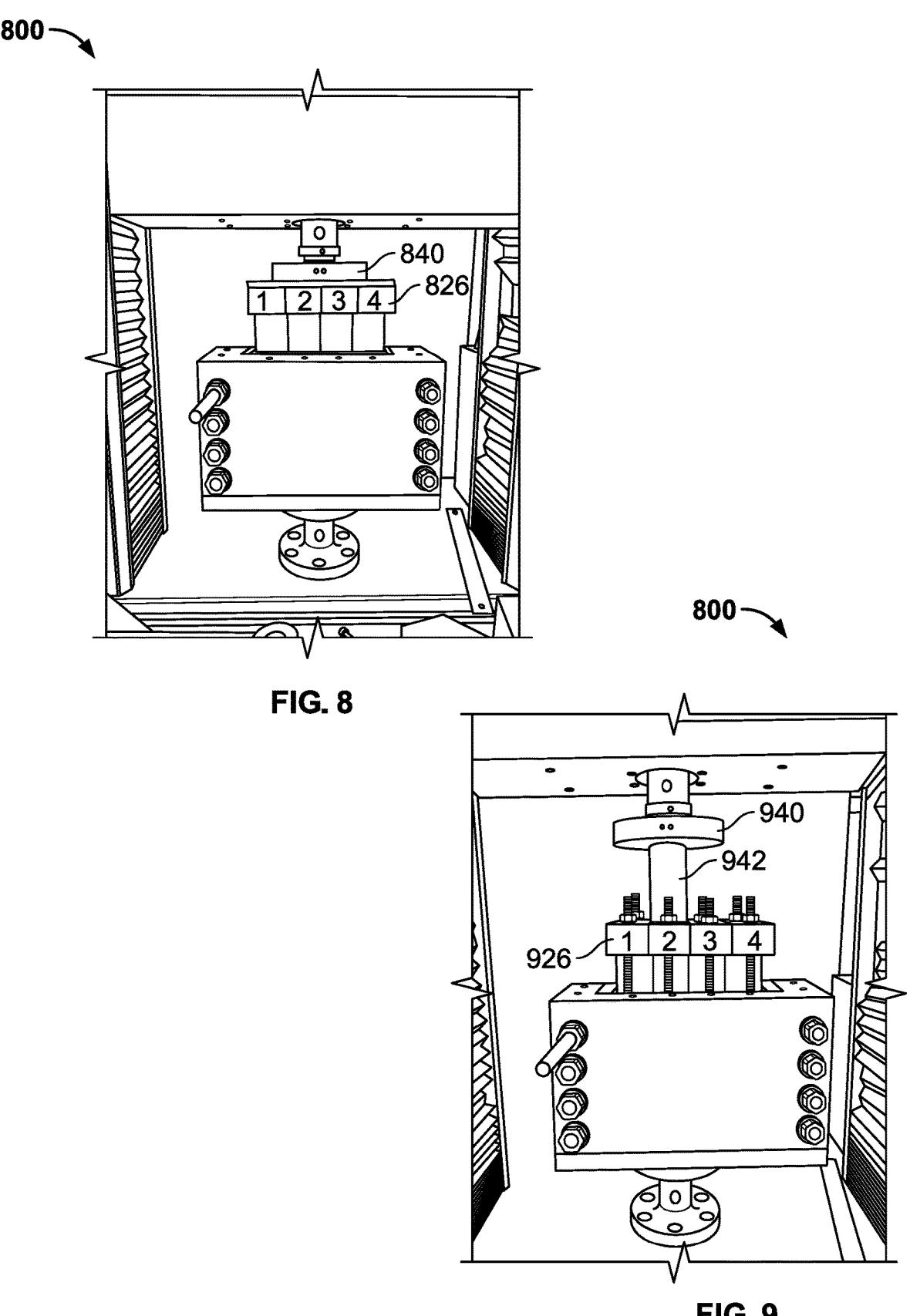
FIG. 8 shows the compaction system of FIGS. 7A and 7B having four pistons compressed at the same time.
FIG. 9 shows a sectional compaction of the compaction system of FIG. 8 where the pistons were compacted one-by-one and after each compaction, the pistons were immobilized.

Referring now to FIG. 8, perspective views of the example compaction system 700 having four pistons compressed at the same time. In an example embodiment, the compaction system 800 includes one or more features of the compaction system 100, 200, 300, 400, and 700 described above with reference to FIGS. 1A, 1B, 2A, 2B, 3, 4A, 4B, 7A and 7B. Compaction system 800 includes compression actuator 840 compresses the four pistons 826 at the same time to a first initial compression level.

Referring now to FIG. 9, is a perspective view of the compaction system 800 of FIG. 8 where the pistons 926 of example compaction system 900 is compacted one-by-one and after each compaction, the pistons are immobilized. FIG. 8 includes four pistons 926 (e.g., labeled 1, 2, 3, and 4) each compacted one at a time with compaction actuator 940 having extension bar 942. The four pistons 926 were compacted one by one and after each compaction, the pistons were immobilized with fasteners. For example, piston 1 is compressed by compression actuator 940 while pistons 2, 3, and 4, are immobilized. After compression of piston 1, piston 2 can be mobilized and piston 1 is immobilized, piston 2 is compressed by compression actuator 940. Continuing with this example, after compression of piston 2, piston 3 can be mobilized and piston 2 is immobilized, piston 3 is compressed by compression actuator 940, and after compression of piston 3, piston 4 can be mobilized and piston 3 is immobilized, piston 4 is compressed by compression actuator 940. This procedure is described in detail in connection with Example 3.

Figure 10A:
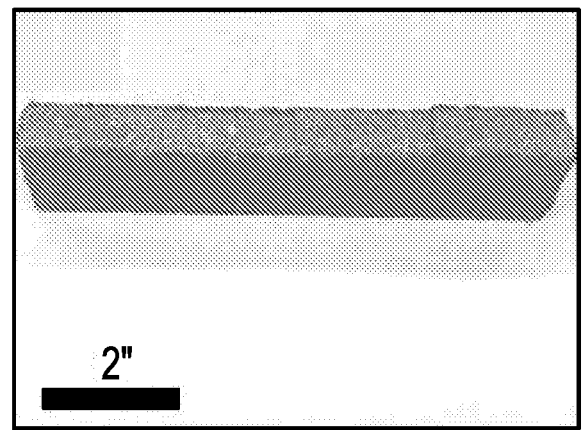
FIG. 10A shows an example cured sample generated from the compaction system of FIGS. 7, 8, and 9.
Figure 10B:
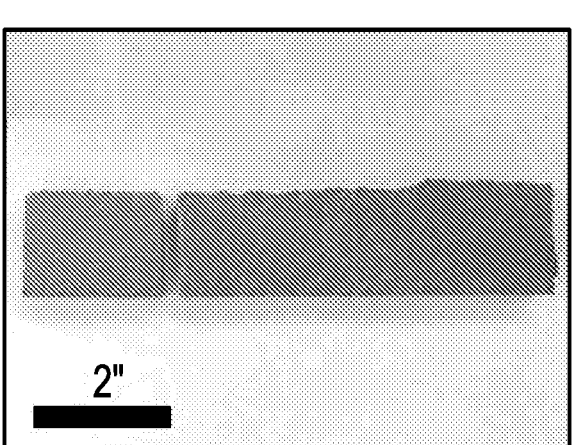
FIG. 10B shows an example of the cured and sectioned sample generated from the compaction system of FIGS. 7, 8, and 9.
Figure 10C:
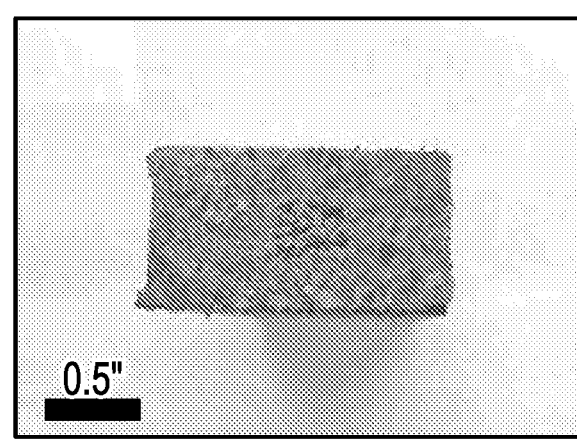
FIG. 10C shows a cross-section view of the cured and sectioned sample generated from the compaction system of FIGS. 7, 8, and 9 to expose a dry sand filling.
Figure 10D:
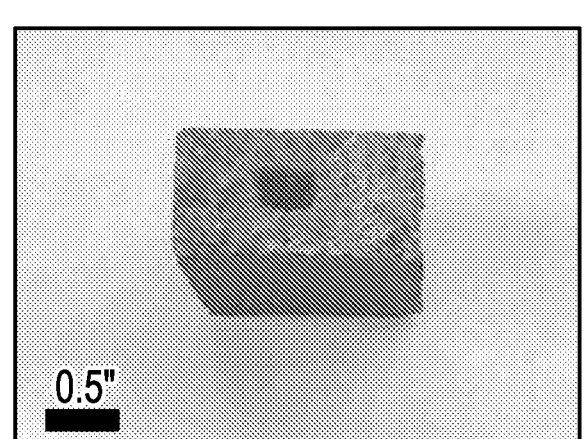
FIG. 10D shows a cross-section view of the cured and sectioned sample generated from the compaction system of FIGS. 7, 8, and 9 that has been cured and sectioned without the dry sand filling to expose the hollow structure.

FIG. 10A is an example of a cured sample generated from the compaction system of FIGS. 7A, 7B, 8, and 9. FIG. 10B is an example of the cured and sectioned sample generated from the compaction system of FIGS. 7, 8, and 9. FIG. 10C is a cross-section view of the cured and sectioned sample generated from the compaction system of FIGS. 7, 8, and 9 to expose a dry sand filling. FIG. 10D is a cross-section view of an of the cured and sectioned sample generated from the compaction system of FIGS. 7, 8, and 9 that has been cured and sectioned without the dry sand filling to expose the hollow structure. The example embodiments described in connection with FIGS. 7A, 7B, 8, 9, 10A, 10B, 10C, 10D and Example 3 are examples of section compression having materials having different binder components. For example, dry sand (or other filler having decreased binder content are selectively positioned in molds to generate shapes and voids within the compressed parts. In this way, sectioned compaction produces large parts having various shapes and voids.

In some incidences it may be desirable to generate a cylindrical or otherwise round large part. For example, sectioned compaction produces large parts that are cylindrical. Cylindrical compaction system are similar in some ways to rectangular compaction systems. In some embodiments, cylindrical compaction systems include a compression rod that compresses cover blocks to form the sectioned compaction of the large part.

For example, in some embodiments, a mold assembly can include a one or more side walls coupled to a bottom wall that form a shaped mold cavity. In some embodiment, the mold is U-shaped. The mold assembly can include one or more pistons each moveable along a respective axis to compress a first composite material into the U-shaped mold cavity. Each respective axis is parallel from an adjacent axis. In some embodiments, the composite material can include less than 18% binder. In some embodiments, one or more of the pistons can be compressed at a first pressure for a first period of time into the composite material with the U-shaped mold cavity. In this example, a second composite material that can be added to the mold cavity after the first period of time. In some embodiments, the second composite material does not contain binder. In some embodiments, the second composite material is dry sand. In some embodiments, a third composite material can be added to the mold after the addition of the second composite material. In this example, the one or more pistons can be sequentially compressed onto the third composite material, where each piston compresses the third composite material for a second amount of time.

Referring now to FIG. 11, perspective view of an example cylindrical compaction system 1100. Compaction system 1100 includes one or more compression rods 1160, one or more fasteners 1130, and one or more side walls 1122. FIG. 11B is an exploded view of an example cylindrical compaction system 1100. In an example embodiment, the compaction system 1100 includes one or more features of the compaction system 100, 200, 300, 4- -, 700, 800, or 900 with reference to FIGS. 1A, 1B, 2A, 2B, 3, 4A, 4B, 7A, 7B, FIG. 8 and FIG. 9. Compaction system 1100 includes a bottom wall 1124, one or more side walls 1122, one or more fasteners 1130, a grate 1162, a plate 1164, a cover block 1166, one or more securing fasteners 1170, and one or more bolts 1168. In some examples, one or more compression rods 1160 are compressed at a time. Portions of the cover block 1166 are held in place by the fasteners 1130. The one or more securing fasteners 1170 affix the cover block 1166 onto the grate 1162. The cover block 1166 include one or more blocks which have threaded holes that match the securing fasteners 1170, they have curved sections having the diameter being about 0.375" diameter to create the cylindrical large part.

Referring now to FIGS. 12A, 12B, and 12C, perspective views of a sectioned compaction system path of a cylindrical compaction system. In this example embodiment of FIG.

12A, the arrow indicates an example path of selective compaction of the cover block. For example, a compression rod (e.g., compression rod 1160) transfers a load from a compression actuator (e.g., compression actuator 1240) to a block within the cover block 1266. In this example, as indicated by the arrow, the compression rod compresses the cover block from the center outward. FIG. 12B is a perspective view of a cylindrical compaction system where the center section has been compacted. FIG. 12C is a perspective view of a cylindrical compaction system where a subsequent section has been compacted having a compression actuator 1240 and extension bar 1242.

Various example compression systems described herein facilitate effective, repeatable techniques of sectioned compaction of a composite materials. Referring to FIG. 22, a flow diagram of an example method 2291 of sectioned compaction is shown.

Method 2281 includes operation 2282 immobilizing a first piston over a first portion of composite material. Methods of sectioned compaction 2281 can include features and characteristics similar to compaction systems 100, 200, 300, 400, 500, 700, 800, 900, 1100, 1200, and 1800. Operation 2282 can include immobilizing the first piston from movement along a first longitudinal axis. This can be accomplished with a fastener such as a screw and/or a bolt fixed to the first piston. Operation 2282 can immobilize the first piston at a pressure sufficient to constrain the composite material under the first piston. For example, operation 2282 can optionally include initially moving the first piston to apply a first compression to the composite material under the first piston, then the first piston can be immobilized with a fastener such that the first piston constrains the composite material under the first piston.

A compaction system can include one or more pistons. In some embodiments, the one or more pistons move independently of each other linearly along a respective axis. In some embodiments, each piston moves along respective axis where each axis is positioned parallel to another. In this way, embodiments herein facilitate the selective mobilization and immobilization of one or more pistons.

Method 2281 can include operation 2283 positioning a second piston over a second portion of the composite material. Operation 2283 includes the second piston moveable along a longitudinal axis that is parallel to the longitudinal axis of the first piston. Method 2281 can include operation 2285 applying pressure to the second piston positioned over the second portion of composite material via a compression actuator. The compression actuator can apply force to a piston and the piston can transfer the load from the compression actuator to the composite material beneath the piston. In this example embodiment, the first piston is immobilized along its respective axis and constrains the composite material under the first piston while the compression actuator transfers the load from a compression actuator to the second piston and the composite material under the second piston.

Pistons that were previously immobilized can be mobilized. For example, the fastener facilitating the immobilization of the first piston can be removed and/or decoupled from the first piston such that the first piston can be moveable along its' respective longitudinal axis. For example, method 2281 can include operation 2287 mobilizing the first piston over the first portion of the composite material. In some examples, when the first piston is mobilized, the second piston can be immobilized to constrain the second portion of composite material while the first portion of composite material is compressed. In this way, sectioned compaction facilitates the generation of large parts. Method 2281 can include operation 2289 applying pressure to the first piston positioned over the first portion of composite material via the compression actuator. In this example embodiment, the second piston is immobilized along its respective axis and constrains the composite material under the second piston while the compression actuator transfers the load from the compression actuator to the first piston and the composite material under the first piston.

The formation of precast large parts can include manipulation of pieces that have been compressed. In some example embodiments, method 2281 can optionally include removing the first portion of composite material and the second portion of composite material, inverting the first portion of composite material and the second portion of composite material, applying pressure to the first piston and the second piston compressing the inverted the first portion and the inverted second portion at the first force of 10 kips to 30 kips, via the compression actuator, immobilizing the first piston; and applying pressure to the second piston to compress the inverted second portion of the composite material at the second force of 10 kips to 20 kips. This process is described in Example 1.

Various example compression systems described herein facilitate effective, repeatable techniques of sectioned compaction of composite material using a cover block utilized to constrict a portion of the composite material. In this way, sectioned compaction facilitates the formation of large parts by decreasing the amount of force needed for compression. A cover block can constrain a large portion of composite material while an unconstrained portion is compressed.

Method 2391 includes operation 2392 immobilizing a cover block over a first portion of composite material. Methods of sectioned compaction 2391 can include features and characteristics similar to compaction systems 100, 200, 300, 400, 500, 700, 800, 900, 1100, 1200, and 1800. For example, immobilizing the cover block over a first portion includes one or more fasteners coupled to the cover block to facilitate the immobilization. This can be accomplished with a fastener such as a screw and/or a bolt fixed to the cover block and one or more side walls. Operation 2282 can immobilize the first piston at a pressure sufficient to constrain the composite material under the first piston. For example, operation 2282 can optionally include initially moving the cover block to constrain the composite material under the cover block, then the cover block can be immobilized with one or more fasteners such that the cover block constrains the composite material.

Method 2391 includes operation 2393 positioning a piston over a second portion of the composite material. The piston can be in a position that is moveable along a lateral axis. For example, operation 2393 can optionally include initially moving the piston to an area above the second portion of the composite material under the piston. Method 2391 can include operation 2394 applying pressure, via a compression actuator, to the piston positioned over the second portion of composite material. The compression actuator can apply force to the piston and the piston can transfer the load from the compression actuator to the composite material beneath the piston. In this example embodiment, the cover block is immobilized and constrains the composite material under the cover block while the compression actuator transfers the load from the compression actuator to the piston and the composite material under the piston.

The cover block can be moved to expose a portion of the composite material that was previously constrained. For example, the cover block can be moved to expose the first portion of the composite material and the cover block can be immobilized over a different portion of composite material. In some embodiments, method 2391 includes moving the cover block over a third portion of the composite material. In this example, the first portion of the composite material that was previously constrained by the cover block is now exposed. The third portion of the composite material, in some examples, is a portion of the composite material that was not yet compressed or constrained. Method 2391 may include operation 2396 positioning the piston over the first portion of the composite material. The piston may be manually or mechanically positioned over the first portion of the composite material.

The method 2397 may include operation 2397 applying pressure to the piston positioned over the first portion of composite material via the compression actuator. The compression actuator can apply force to the piston and the piston can transfer the load from the compression actuator to the first portion of composite material beneath the piston. In this example embodiment, the cover block is immobilized and constrains the third portion composite material under the cover block while the compression actuator transfers the load from the compression actuator to the piston and the first portion composite material under the piston.

Optionally, in some example embodiments, methods herein include a curing step. Curing operations can be performed in various ways. For example, in some embodiments, curing is performed in a cast, a mold (e.g., an open mold or a closed mold), or a container. Curing performed in this manner is used to pre-fabricate a variety of cast parts and structural components such as support members and decorative elements that are used in construction applications.

In example embodiments, curing is performed on a support surface (e.g., a planar or a curved surface). For example, composite materials cured on planar or curved surfaces are used as functional material layers in a variety of applications, and as template materials from which various components can be cut or otherwise mechanically excised.

As discussed above, the composite materials disclosed herein include a filler material and a binder material disposed between at least some units of the filler material to form an integral composite material.

In general, the composite materials disclosed herein include relatively small amounts of the binder material(s). However, pressure-based processing of the mixtures of binder and filler materials yields composite materials which nonetheless retain advantageous mechanical and functional properties.

In some embodiments, the filler is wood, fabrics, mats, sand, soil, rocks, concrete, cement, minerals, inorganic compounds, organic compounds, gravels, stones, bricks, metals, alloys, ceramic materials, polymers, elastomeric materials, thermosetting materials, thermoplastic materials, composites, glasses, aerogels, porous materials, cellular materials, aerogels, solid waste, recycled materials, medicine, food, carbon materials, biomass, electrode materials, components of these materials, and combinations of these materials. In certain embodiments, when the filler material is soil, the soil can include various different types of soil, including terrestrial soils and/or extraterrestrial soils (e.g., lunar soil). In some embodiments, the soil includes extraterrestrial soil, rocks, and/or minerals. In some embodiments, when the filler includes rocks and/or minerals, the rocks and/or minerals can be extraterrestrial rocks and/or minerals (e.g., lunar rocks and/or minerals). In some embodiments, the composite materials include one or more filler materials. The filler materials can influence the physical properties of the composite materials, and therefore adjustment of the properties of the composite materials can be achieved through selection of filler materials.

Example binder materials that can be used include thermoplastics, thermosetting materials, elastomers, natural polymers, synthetic polymers, ceramics, glasses, metals, alloys, salts, sulfur-containing compositions, chemical precursors of the foregoing materials, and combinations of the foregoing materials (e.g., polyesters, epoxies, fluoropolymers, phenolic compounds, vinyl esters, carboxymethylcelluloses, polyetherketoneketones, cyclic oligomers, poly(methyl methacrylates), polycarbonates, and polybutylene terephthalates). In some embodiments, the composite materials include one or more binder materials. The binder material content of the composite material typically influences the composite material's compressive strength, flexural strength, or both, as microagglomerations of the binder material are positioned between units of the filler material and can support a variety of material loads. Accordingly, properties of the composite materials can be modified by including particular binder materials within the composite materials.

Compressive strength is the resistance of a material to a compressive force applied to the material and having a tendency to reduce the volume of the material. To determine the compressive strength of a material, a compressive force is applied to the material, with the applied force increasing until the material is crushed (i.e., permanently deforms in a dimension along which the force is applied and/or fractures into multiple pieces due to the applied force). The compressive strength of a material, as used herein, is defined as $F_c/A_0$, where $F_c$ is the compressive force that crushes the material and $A_0$ is the initial cross-sectional area of the material over which the force is applied.

As used herein, the term "flexural strength" refers to the resistance of a material to a force applied to the material and having a tendency to bend or elongate the material. A material's flexural strength corresponds to the peak stress experienced in a material prior to the material yielding (i.e., fracturing) in a flexure test.

To determine the flexural strength of a material, a three-point bending test is used. In a three-point bending test, the material is formed as a beam and supported at two fixed positions (e.g., near the ends of the material) on the same side of the material, and a piston contacts the opposite side of the material midway between the fixed positions, applying a compressive force that tends to cause a bending deformation of the material. The flexural strength of a material, as used herein, is defined as $R=(3/2)(P_{max}L/bd^2)$, where $P_{max}$ is the maximum load applied during the three-point bending test (i.e., the maximum load that can be sustained by the material without yielding (i.e., fracturing), b is the sample width, L is the span length between the fixed supports, and d is the sample height/thickness (i.e., in a direction along which the force is applied).

In some embodiments, the composite materials include less than 18% by weight of the binder material (e.g., less than 14% by weight of the binder material, less than 10% by weight of the binder material, less than 9% by weight of the binder material, less than 8% by weight of the binder material, less than 7% by weight of the binder material, less than 6% by weight of the binder material, less than 5% by weight of the binder material, less than 4% by weight of the binder material, less than 3% by weight of the binder material, less than 2% by weight of the binder material, less than 1% by weight of the binder material, less than 0.5% by weight of the binder material, less than 0.2% by weight of the binder material). In some embodiments, the composite materials include less than 18% by weight of the binder material.

In certain embodiments, the composite materials include less than 20% by volume of the binder material (e.g., less than 19% by volume of the binder material, less than 18% by volume of the binder material, less than 17% by volume of the binder material, less than 16% by volume of the binder material, less than 15% by volume of the binder material, less than 14% by volume of the binder material, less than 13% by volume of the binder material, less than 12% by volume of the binder material, less than 11% by volume of the binder material, less than 10% by volume of the binder material, less than 9% by volume of the binder material, less than 8% by volume of the binder material, less than 7% by volume of the binder material, less than 6% by volume of the binder material, less than 5% by volume of the binder material, less than 4% by volume of the binder material, less than 3% by volume of the binder material, less than 2% by volume of the binder material, less than 1% by volume of the binder material). In some embodiments, the composite materials include less than 10% by weight of the binder material and less than 20% by volume of the binder material.

In some embodiments, the binder material can be diluted with at least one of a solid, a liquid, or a gas. Example diluents include, but are not limited to, water, aqueous solutions, organic solvents (e.g., ethanol), solutions including organic solvents, surfactants, surfactant-releasing solids or gels, gas bubbles, gas generation agents, inorganic solvents, solutions including inorganic solvents, lubricants, and/or solid particles. In some embodiments, the binder material includes chemical precursors (e.g., resins, initiators, or hardeners) that react and/or harden during fabrication (e.g., during the curing step) to form, for example, various polymers.

In some embodiments, the size distribution of units of the filler materials can be random. In certain embodiments, the size distribution of units of the filler materials can be controlled, using, for example, sieve analysis, size selection, size exclusion, and/or size promotion.

The composite materials disclosed herein can also include other types of materials for structural and functional applications. For example, the composite materials can include at least one aggregate material to add mechanical strength to the composite material structure. The composite materials can also include at least one reinforcing material to augment the structural integrity of the composite materials. These additional materials can generally be added at any time during fabrication of the composite materials, for example, during the formation of the mixture of filler material and binder material, or before, between, or after the application of pressure to the mixture.

Example aggregate materials that can be used include any of the filler materials disclosed herein. In some embodiments, aggregate materials can be subjected to a surface treatment or coating prior to inclusion in the composite material. The surface treatment or coating adjusts the bonding strength of the aggregate material.

Example reinforcing materials include any of the filler materials described herein. Reinforcing materials can also be subjected to surface treatments or coatings to adjust the bonding strength of the reinforcing materials.

In some embodiments, the composite materials can include at least one additive. Additives can, for example, adjust the properties of the composite material or aid in the preparation of the composite material. Example additives include, but are not limited to, foaming agents, bubble-generating agents, solvents, lubricants, components of the foregoing materials, and combinations of the foregoing materials. Additives can be combined with other components of the composite materials at various stages of fabrication, including prior to applying pressure to the composite materials, and between pressurization cycles. In addition, additives can be added to only certain regions of a mixture or a composite material so that the properties of the composite material are different at different locations within the material.

In some embodiments, the composite materials disclosed herein can include more than one binder material and/or more than one filler material. Combinations of multiple binder materials and/or multiple filler materials can be used to prepare composite materials having particular physical properties (e.g., flexural strength, compressive strength) and/or particular functional properties (e.g., electrical resistance). In general, a wide variety of different combinations of filler materials and binder materials can be used, including combinations of any of the filler materials and any of the binder materials disclosed herein. In some embodiments, the composite materials disclosed herein can include 2 or more different filler materials (e.g., 3 or more different filler materials, 4 or more different filler materials, 5 or more different filler materials, or even more different filler materials). In certain embodiments, the composite materials disclosed herein can include 2 or more different binder materials (e.g., 3 or more different binder materials, 4 or more different binder materials, 5 or more different binder materials, or even more different binder materials).

In some embodiments, the distribution of a binder material within the composite material is non-uniform. Such materials can include distinct regions in which the binder material distribution or concentration is constant, but where the binder distribution or concentration differs among at least some of the regions. In some examples, the distribution or concentration of the binder material varies continuously from one location to another within the material.

Similar considerations apply to filler materials. In certain composite materials, the distribution of a filler material is non-uniform. The concentration or distribution of the filler material can vary in step-wise fashion between different regions of the composite material, or in a smoothly varying continuous or semi-continuous fashion through the composite material.

In addition, for composite materials that include two or more filler materials and/or two or more binder materials, the distribution or concentration of each of the binder materials and/or each of the filler materials can vary as discussed above.

EXAMPLES

Example 1

Sodium hydroxide solution (14 M) was prepared 1 day before use. A glass bottle having 80 ml water was placed in a larger glass container. Both were centered on a magnetic stirrer. Iced water was filled into the glass container until reaching the liquid level in the glass bottle. A magnetic stir bar (4 mm by 12 mm) was placed into the glass bottle. Sodium hydroxide granules (FISHER CHEMICAL®, 178122) of 44.8 g were added into the glass bottle and were dissolved at a speed of 300 rpm at room temperature for 12 hours. Sand (QUIKRETE®-1152, all-purpose sand) and class F fly ash (DIVERSIFIED MINERAL™ Inc.) were air-dried. The drawing of a compaction system 1 is shown in FIG. 1. The system was formed by two large sidewalls, two small sidewalls, six locking bars, four compressing pistons, a bottom wall, and two extension bars. The compaction process is finished in 4 sections by using a type-5582 INSTRON® universal testing machine. The details of main components are listed below:

Large sidewalls: Each large sidewall is 8" high, 8" wide, and 1" thick, made from 304 stainless steel. Two large sidewalls are bolted by four threaded rods and eight nuts at each side. An inner 0.125" gap was designed at the inner surface of each large sidewall. A 0.25" fillet was designed at the top inner edge of each large sidewall.

Small sidewalls: Each small sidewall is 8" tall, 2.5" wide, and 0.75" thick, made from 304 stainless steel. Two small sidewalls are inserted between the two large sidewalls. They define the sample thickness. Four threaded rods pass through the small sidewall. An inner 0.125" gap was designed at the inner surface of each small sidewall. A 0.25" fillet was designed at the top inner edge of each small sidewall.

Locking bars: Each cylindrical locking bar is 3" long and 1" in diameter, made of 304 stainless steel. Three locking bars are placed at each side of the system. Compressing pistons: Compressing bars are T-shaped, made of 304 stainless steel. Its cross section is 0.75" by 0.75" and the height is 5". It can be compressed either individually or together having adjacent compression pistons. Each piston can be bolted to the large sidewalls by two steel socket head screws (½ in.-13, grade 8).

Bottom wall: The bottom wall is 8" in length, 2.75" in width, and 0.5" in thickness, made of 304 stainless steel. It is bolted onto the large sidewalls.

Extension bars: Extension bars are for compacting individual piston or compacting multiple pistons at a time. They have the same cross sections of the compression piston, and are 2" tall. They are made of 304 stainless steel. The compaction process is described below:

Set the INSTRON® universal testing machine to the compression mode. Install the 100 kN load cell and calibrate it.

Clean the surface of the compaction system. Insert the locking bars to locate and affix the large sidewalls and the small sidewalls. Attach the bottom wall and bolt it onto the bottom of the large sidewalls. Use threaded rods and nuts to tightly bolt the two large sidewalls. Attach liners on the inner sides of the two large sidewalls. The liners are thin nylon sheet, having the same size of the large side wall and the thickness ~0.4 mm.

Weigh 0.0325 lb sodium hydroxide solution and 0.065 lb sodium silicate solution (SIGMA-ALDRICH®, MKCD8509). Mix the two solutions in a glass bottle and shake it for 1 min to obtain the alkali solution (AS). Weigh 0.85 lb sand and 0.15 lb fly ash. Mix the sand and the fly ash using a KITCHENAID® Professional 600 Stand Mixer at low speed (speed 2) for 5 minutes. Add AS to the mixture and mix them at speed 4 for 3 minutes. Manually mix the material for 1 min until it is uniform. Pour the material into the compaction system in three equal lots. Manually compact the material during pouring.

Clean the inner surfaces of the top part of the system and apply lubricant on the surfaces. The lubricant is WD40™ (general purpose lubricant). Clean the pistons and apply a thin layer of lubricant on them. Place the four pistons together to the top of the system. Center the system on the compaction stage. Compact the four pistons at the same time to 20.23 kips (90 kN), as shown in FIG. 3. Hold the pressure for 1 min and release the force. Bolt the four pistons down to the large sidewalls.

Place the extension bar on top of the first and the second pistons. Center the extension bar having the compaction platen. Compact it to 15.51 Kips (69 kN) at a loading rate of 15 mm/min (FIG. 4A). Hold the pressure for 1 min and release the force. Tighten the bolts on these pistons. Repeat the same action on the third and the fourth pistons (FIG. 4B).

Disassemble the system. Take the compacted material out and put it back into the system upside down. Assemble the system as stated above and repeat the previous two instructions.

Cover the compaction system with two layers of cling film (REYNOLDS®, 914SC). Move the compaction system into a gravity convection oven (JEIO TECH CO.® Inc., OF-12G-120) and cure the sample at 85° C. for 48 hours. FIG. 6 shows typical cured materials. Altogether 5 1-lb samples were fabricated. For each of them, compression test and flexural test were completed within 12 hours after curing. The 1-lb sample was removed from the oven and cooled in air for 1 hour. Testing specimens were harvested from both the upper section and the lower section of the 1-lb sample, to measure the compressive strength and the flexural strength. Cutting was performed by using a MTI® SYJ-40-LD diamond saw. The specimen surfaces were polished by 320-grit sandpapers. Cubic specimens were tested to measure the compressive strength. The loading rate was 6 mm/min. The peak loading force ($F_c$) was recorded. The compressive strength was calculated as $\sigma_c = F_c/(ab)$, where a is the length and b is the width. Beam specimens were tested to measure the flexural strength, having a three-point bending setup. The loading rate at the middle point was 6 mm/min, and the peak loading force ($F_f$) was recorded. The flexural strength is calculated as $\sigma_f = 3F_fL/(2bd^2)$, where L is the support span, b is the width, and d is the height.

The measured compressive strength is shown in Table 1. The compressive strength of the five 1-lb samples is 4713±276 psi. The measured flexural strength (two specimens from each sample) are shown in Table 2. The average flexural strength of the five 1-lb samples is 1565±65 psi. From a same 1-lb sample, 5 specimens were harvested from various locations. Their measurement results are shown in Tables 3 and 4. The compressive strength of the 5 specimens is 4716±212 psi. The flexural strength is 1473±77 psi.

TABLE 1

| Compressive strength of 1-lb samples Compressive strength (psi) | | | | |
| --- | --- | --- | --- | --- |
| Sample 1 | Sample 2 | Sample 3 | Sample 4 | Sample 5 |
| 5098 | 4405 | 5129 | 4609 | 5068 |
| 4626 | 4564 | 4550 | 4447 | 4630 |

TABLE 1

Flexural strength of 1-lb samples
Flexural strength (psi)

| Sample 1 | Sample 2 | Sample 3 | Sample 4 | Sample 5 |
|---|---|---|---|---|
| 1675 | 1643 | 1462 | 1569 | 1604 |
| 1543 | 1578 | 1516 | 1500 | 1556 |

TABLE 3

Compressive strength of 5 specimens from the same 1-lb sample
Compressive strength (psi)

| Specimen 1 | Specimen 2 | Specimen 3 | Specimen 4 | Specimen 5 |
|---|---|---|---|---|
| 4689 | 5068 | 4497 | 4630 | 4698 |

TABLE 4

Flexural strength of 5 specimens from the same 1-lb sample
Flexural strength (psi)

| Specimen 1 | Specimen 2 | Specimen 3 | Specimen 4 | Specimen 5 |
|---|---|---|---|---|
| 1501 | 1366 | 1500 | 1569 | 1431 |

Example 2

Sand (QUIKRETE®-1152, all-purpose sand) was air-dried. Ordinary Portland Cement (CALPORTLAND®, low alkali type II/V) was sealed before use. The compaction system is the same as that of Example 1 (FIG. 2). The compaction process is shown below:

Set the INSTRON® universal testing machine to the compression mode. Install the 100 kN load cell and calibrate it.

Clean the surface of the compaction system. Insert the locking bars to locate and affix the large sidewalls and the small sidewalls. Attach the bottom wall and bolt it onto the bottom of the large sidewalls. Use threaded rods and nuts to tightly bolt the two large sidewalls. Attach liners on the inner sides of the two large sidewalls. The liners are thin nylon sheet having the same size of the large side wall and the thickness ~0.4 mm.

Weigh 0.87 lb sand and 0.1 lb cement. Mix them with a KITCHENAID® Professional 600 Stand Mixer at low speed (speed 2) for 5 minutes. Weigh 0.03 lb water and pour it into the mixture of sand and cement. Mix them at speed 4 for 3 minutes. Manually mix the material for 1 min. Pour the material into the compaction system in three equal lots. Manually compact the material during pouring.

Clean the inner surfaces of the top part of the system and apply lubricant on the surfaces. The lubricant is WD40™ (general purpose lubricant). Clean the pistons and apply a thin layer of lubricant on them. Place the four pistons together to the top of the system. Center the system on the compaction stage. Compact the four pistons at the same time to 20.23 kips (90 kN), as shown in FIG. 3. Hold the pressure for 1 min and release the force. Bolt the four pistons down to the large sidewalls.

Place the extension bar on top of the first and the second pistons. Center the extension bar having the compaction platen. Compact it to 17.95 Kips (79.84 kN). at a loading rate of 15 mm/min (FIG. 4A). Hold the pressure for 1 min and release the force. Tighten the bolts on these pistons. Repeat the same action on the third and the fourth pistons (FIG. 4B).

Disassemble the system. Take the compacted material out and put it back into the system upside down. Assemble as above and repeat the previous two instructions.

Cure the sample at room temperature (22° C.). Standard moist curing was performed during the whole curing time. Altogether 5 1-lb samples were fabricated. For each of them, compression test and flexural test were carried out. Testing specimens were harvested from both the upper section and the lower section of the 1-lb sample, to measure the compressive strength and the flexural strength. Cutting was performed by using a MTPJ SYJ-40-LD diamond saw. The specimen surfaces were polished by 320-grit sandpapers.

Cubic specimens were tested to measure the compressive strength. The loading rate was 6 mm/min. The peak loading force (Fe) was recorded. The compressive strength was calculated as $\sigma_c = F_c/(ab)$, where a is the length and b is the width. After 3 days, 7 days, and 14 days, the measured compressive strengths are 10.9 MPa, 27.9 MPa, and 29.2 MPa, respectively.

Beam specimens were tested to measure the flexural strength, in a three-point bending setup. The loading rate at the middle point was 6 mm/min, and the peak loading force ($F_f$) was recorded. The flexural strength is calculated as $\sigma_f = 3F_f L/(2bd^2)$, where L is the support span, b is the width, and d is the height. After 7 days, the measured flexural strength was around 6 MPa.

Example 3

The materials and the preparation procedure were the same as in Example 2. A different compaction system was designed and used to perform the sectioned compaction processing (FIG. 7). The system comprised two U-shaped walls, four inner walls, four compression pistons, a bottom wall, two fixture bars, and two extension bars. The compaction process was completed in 4 sections, by using an INSTRON® type-5582 machine having the load capacity of 22.48 kips (100 kN) or a SATEC® universal testing machine having the capacity of 600 kips (2669 kN). The main components are listed below:

U-shaped walls: Each U-shaped wall is 8" high, 14" wide, and 2" thick, made of A36 steel. The two ends of it are 1.375" higher than the channel part. Two U-shaped walls are bolted by eight threaded rods (¾ in.-10, grade 8) and sixteen nuts (¾ in.-10, grade 8).

Four inner walls: Two large inner walls are 8" high, 8" wide, and 1" thick, made of A2 tool steel. Two small inner walls are 8" high, 2.75" wide, and 1" thick, made of A2 tool steel. A 0.0625" inner gap was designed at the inner surface of each inner wall. A 0.25" fillet was designed at the top inner edge of each wall.

Compression pistons: Compression pistons are T-shaped, made from A36 steel. Each of them has a 2" by 0.75" cross section and the length of 7". One or more compression pistons can be compressed at each step. Each piston can be bolted on to the large sidewalls by two threaded rods (½ in.-13, grade 8) and two nuts (½ in.-13, grade 8).

Bottom wall: The bottom wall is 14" long, 6" wide, and 1" thick, made from A36 steel. It is bolted onto the U-shaped walls by socket head screws (½ in.-13, grade 8).

Two fixture bars: Fixture bars are 14" long, 1' wide, and 1" tall, made of A36 steel. They can be bolted onto the top surface of the U-shaped walls by socket head screws (½ in.-13, grade 8).

Extension bars: Extension bar has the same cross section as the compression piston, and is 2" tall. They are made of A36 steel. The compaction procedure is shown below:

Set the INSTRON® machine to compression mode. Install the 100 kN loadcell and calibrate it.

Clean the surface of the compaction system. Use threaded rods and nuts to tightly bolt the two U-shaped walls together. Attach the bottom wall and bolt it onto the bottom of the U-shaped walls. Place the four inner walls in the system and attach liners on the inner surfaces.

Weigh 0.1 lb ordinary Portland cement (OPC) and 0.85 lb regular sand. Mix them with the KITCHENAID® Professional 600 Stand Mixer at Speed 2 for 5 minutes. Then, weigh 0.05 lb water, and add it to the mixture of sand and OPC. Continue the mixing at speed 4 for another 3 minutes. After that, manually mix the material for 2 min. Separate the material into three equal parts. Pour the first part into the compaction system, and manually densify the material. Lay a 1"×0.25"×5" glass bar on top of the densified material and center it. Pour the second part of the material around the glass. Densify the material again, and adjust the glass bar so that its upper surface remains exposed. Then, take the glass bar out, leaving an empty cavity in the interior. Fill dry sand into the cavity by using a long-neck funnel. Finally, pour the third part of material into the system, covering the dry sand section and the sections of the first and second parts of sand-OPC mixture.

Clean the inner surfaces of the top part of the system and apply lubricant on the surfaces. Clean the pistons and apply a thin layer of lubricant on them. Place the four pistons to top of the sand-OPC mixture. A rubber hammer can be used to adjust the piston position. Center the system on the compaction stage. Compact the four pistons at the same time (FIG. 8) to 21.76 Kips (96.78 kN) at the loading rate of 15 min/min. Hold the peak pressure for 1 min and release the force. Bolt the four pistons down to the large sidewalls.

Place the extension bar on top of the first piston. Center the extension bar having the compaction platen. Compact it to 21.76 Kips (96.78 kN) at a loading rate of 15 mm/min (FIG. 9). Hold the peak pressure for 1 min and release the force. Tighten the nuts on top of the piston. Repeat the same operation on the other three pistons. If we use the SATEC® universal testing machine, a higher peak compaction pressure of 14503.8 psi (100 MPa) can be reached.

Remove the compaction system from the compression machine. Keep the sample in the compaction system for 24 hours. Then, disassemble the compaction system and take the sample out. Standard moist curing was performed at room temperature (22° C.) (FIG. 10A). After curing, the sample was cut along the transverse direction (FIGS. 10B and 10C) to expose the interior. The dry sand was removed from the cavity, to form a hollow structure (FIG. 10D). The strength of the mate-rial was measured in the same procedure as in Example 1. The compression strength was 34 MPa.

Example 4

A system was developed to fabricate a 1-lb sample of low binder content through sectioned compaction. The filler was 96 wt. % sand, and the binder was 4 wt. % epoxy. A steel cylinder was used as the container. The compaction process was conducted in 10 steps. In each step, a section of the material was compressed by a type-5582 INSTRON® universal testing machine at 100 kN. FIG. 11 shows the system. Premixed filler and binder was in the steel cylinder (3.125" inner diameter, 1.375" wall thickness, 3.5" height). A 0.25" thick steel plate was bolted at the bottom, and a steel grate was on the top, in which securing screws are braced. The key system components include:

Compressing Pistons: One or more may be compressed at a time. Other cover blocks are held in place by the securing screws. The pistons are made from steel (0.375" in diameter).

Securing Screws: The diameter of the screws are about 0.625". They affix the cover blocks onto the grate.

Cover Blocks: The blocks are made of stainless steel (0.75" thick). They have threaded holes that match the screws. They have curved sections, with the diameter being 0.375" diameter.

Liner: A thin aluminum sheet (0.005" thick) is used as the liner at the inner surface of the steel cylinder. Tooling grease is applied between the steel surface and the aluminum sheet. With the above system, 1-lb sand-epoxy composite samples were produced. The operation procedure is given below:

Preheat oven to 150° C.; set the INSTRON® machine in compression mode.

Weigh 0.96 lbs. all-purpose sand; weight 0.3 lbs. EPON' 828 epoxy resin and 0.1 lbs. EPIKURE® 3230 hardener (both obtained from HEXION®) and mix them together; mix the resin hardener mixture with the sand; pour the sand-binder mixture into the mold.

Using eight 0.3125" bolts to attach the 0.5" thick steel plate to the bottom of the steel cylinder; the bolts need to be completely screwed into the counter bore holes so that the bottom is flat).

Take the thin metal sheet liner and apply high-pressure grease to one side of it; bend the sheet into a circle and place, with the greased side toward outside; place the liner roll into the steel cylinder; press the liner against the inner surface of the steel cylinder; WD-40® mold release spray is sprayed to all the interfaces and screw/bolt holes.

Place the cover blocks on top of the sand-binder mixture; use WD-40® mold release spray at all the interfaces and threaded holes; all the surfaces in contact with the sand-binder mixture should coated with the mold release.

Flatten the cover blocks, and place a steel plate on top of them; place the ~3" diameter steel piston to top of the plate; lower the crosshead of the INSTRON®-5582 machine to near the upper surface of the compression piston.

Set the INSTRON® crosshead rate to 6 mm/min; set the load limit to 50 kN; perform the first compression, and then unload.

Remove the cover plates and piston; take the compacted sand-binder mixture out of the steel cylinder, and break apart it to small pieces, less than 1 mm large; place the mixture into the steel cylinder again.

Sectioned compaction: Place the cover blocks onto the sand-binder mixture; install the grate; secure all the securing screws, except for the cover plate to be compressed; set the load limit of the INSTRON® machine to 36 kN; compress the cover plate one by one clockwise (FIG. 12); when one cover plate is being compressed, all the other plates should be affixed with the grate by the screws; unload the INSTRON® machine when all the cover plates have been compressed.

Remove the compression pistons, cover blocks, grate, and the securing screws; rotate the grate by 45°; install the compression rods, cover blocks, grate, and the securing screws again; repeat the sectioned compaction described above.

Remove the grate, the securing screws, and the eight bolts that hold the grate; extract the compacted material out of the steel cylinder.

Move the compacted material to a convection oven, and cure it at 150° C. for 1 h, following by air cooling. After curing, the strength of the material was measured through the same procedure as in Example 1. The flexural strength was ~25 MPa.

Example 5

Municipal solid waste incineration (MSWI) bottom ash (BA) and fly ash (FA) were obtained from the York County Resource Recovery Center. Table 5 shows their compositions. Sodium silicate ($Na_2SiO_3$) solution (SIGMA-ALDRICH® 338443-1L) and sodium hydroxide (NaOH) pellets (SIGMA-ALDRICH® S5881-500G) were used to prepare the alkaline activator (AA). The NaOH pellets were dissolved in deionized water one day in advance. The concentration of the NaOH solution was 14 M. AA was formed by mixing the $Na_2SiO_3$ solution and the NaOH solution, having the mass ratio being 2.5 or 2. The chemical compositions of the $Na_2SiO_3$ solution and the NaOH solution are shown in Table 6.

| Oxide composition in the MSWI ashes | | |
|---|---|---|
| Oxide (wt %) | MSWI bottom ash (BA) | MSWI fly ash (FA) |
| $SiO_2$ | 40.176 | 13.328 |
| $Al_2O_3$ | 10.789 | 5.191 |
| CaO | 21.164 | 50.296 |
| $Fe_2O_3$ | 9.468 | 2.18 |
| MgO | 3.612 | 2.256 |
| $K_2O$ | 1.458 | 2.164 |
| $Na_2O$ | 3.066 | 0.385 |
| $SO_3$ | 2.568 | 9.416 |
| $P_2O_5$ | 3.06 | 1.622 |

| Sodium silicate solution | NaOH solution (14M) |
|---|---|
| $Na_2O$: 10.6 wt % $SiO_2$: 26.5 wt % | $Na_2O$: 27.9 wt % |

The MSWI-BA was dried at 85° C. for 1 day in a Jeio ON-01E-120 gravity convection oven (FIG. 13). For some samples, sieve analysis was performed to remove the BA particles larger than 1 mm; other samples used the BA without sieving. FIG. 14A shows the pre-mixed BA and FA. The mix proportion and the processing parameters are listed in Table 7. About 3 g BA and FA were first mixed manually by a lab spatula for 1 min (FIG. 14B), followed by the addition of AA (FIG. 14C) and the continued manual mixing for 5 min.

TABLE 7

| The mix proportion and the processing parameters | | | | | | | |
|---|---|---|---|---|---|---|---|
| Sample no. | BA (wt %) | FA (wt %) | AA (wt %) | $Na_2SiO_3$ solution/ NaOH solution ratio | $P_c$ (MPa) | Curing temperature (° C.) | Clamping with the C-clamp |
| 1 | 66.6 | 16.7 | 16.7 | 2.5 | 200 | 85 | No |
| 2 | 69 | 17.2 | 13.8 | 2 | 200 | 85 | No |
| 3 | 53.8 | 23.1 | 23.1 | 2 | 200 | 85 | No |
| 4 | 60 | 20 | 20 | 2 | 200 | 85 | Yes |
| 5 | 66.6 | 16.7 | 16.7 | 2 | 200 | 85 | Yes |
| 6 | 60[a] | 20 | 20 | 2 | 200 | 60 | Yes |
| 7 | 56.5[a] | 18.8 | 24.7 | 2 | 100 | 60 | Yes |
| 8 | 50[a] | 16.7 | 33.3 | 2 | 50 | 85 | Yes |

[a]Sieve-analyzed (<1 mm

The premixed BA, FA, and AA was compacted in a stainless-steel cylinder. The inner diameter of the cylinder was 18.9 mm; the outer diameter was 50.88 mm; the height was 50.3 mm. Two stainless-steel pistons (diameter: 18.8 mm; height: 25.44 mm) end-capped the cylinder from the top and the bottom, respectively. The mixture was confined in the middle. In an INSTRON® type-5582 testing machine, having the loading rate of 6 mm/min, the top piston was intruded into the cylinder, until the peak compaction pressure ($P_c$) was reached. $P_c$ ranged from 50 MPa to 200 MPa. The peak compaction pressure was maintained for 5 min, and then the compaction force was decreased to zero at the unloading rate of −6 mm/min.

For some samples, the compacted material was transferred to a slightly larger steel cylinder (inner diameter: 19.1 mm). For other samples, the compacted material remained in the compaction cylinder, and the two pistons were firmly affixed by a C-clamp. The cylinder was sealed by 3 layers of polyvinyl chloride (PVC) cling film (REYNOLDS®-914SC). Curing was performed in the JEIO® ON-01E-120 oven for 48 h. The curing temperature was 60° C. or 85° C.

A typical cured sample is shown in FIG. 15A (top view). The cured samples were cut into beam specimens by a MTI® SYJ-40-LD diamond saw. The length, height (d), and width (b) of the beam specimen (FIG. 15B) were 19 mm, 6.3 mm, and 6.3 mm, respectively. The surfaces were smoothened by a set of 320-grit sandpapers. The beam specimens were tested in a three-point bending setup. A beam specimen was simply supported at the two ends, with the span (L) being 16 mm. In the type-5582 INSTRON® machine, a 4 mm-diameter steel pin was pressed onto the middle point of its upper surface, until the specimen failed. The flexure strength was calculated as $$R = \frac{3}{2}\frac{P_m L}{bd^2},$$

where $P_m$ is the peak loading. FIG. 16A shows the measurement results in flexural strength and FIG. 16B flexural strain.

Example 6

Standard all-purpose sand was provided by QUIKRETE®, with the part number of 1152. It was used as the filler. Epoxy resin (4,4-isopropylidenediphenol-epichlorohydrin copolymer resin, EPON™-828) and its hardener (polyoxypropylene diamine, EPIKURE®-3230) were obtained from HEXION™, and were used as the binder. The hardener-to-resin mass ratio was 0.35. About 435 g of air-dried sand and 18 g of epoxy-hardener mixture were premixed in a container by using a lab spatula for 5 minutes, as shown in FIG. 17A-17C.

Table 8 list the key components of the processing system. The premixed filler and binder material was placed in a steel cylinder FIG. 18(a-b). The inner surface of the cylinder was covered by a thin layer of aluminum liner. A tooling grease was applied between the steel surface and the liner. A steel plate was bolted at the bottom of the cylinder. WD-40® mold release was sprayed to all the interfaces and the screw and bolt holes.

FIGS. 18A, 18B, 18C, and 18D is an exploded view of an example cylindrical compaction system. Some components of FIGS. 18A, 18B, 18C, and 18D are analogous to FIGS. 1A, 1B, 2A, 2B, 3, 4A, 4B, 7A, 7B, FIG. 8 and FIG. 9. Compaction system 1800 includes one or more compression rod 1860, one or more fasteners 1830, and one or more side walls 1822, a bottom wall 1824, one or more side walls 1822, one or more fasteners 1830, a grate 1862, a plate 1864, a cover block 1866, one or more securing fasteners 1870, and one or more bolts 1868. In some examples, one or more compression rods 1860 can be compressed at a time. Portions of the cover block 1866 are held in place by the fasteners 1830. The one or more securing fasteners 1870 affix the cover block 1866 onto the grate 1862. The cover block 1866 include one or more blocks which have threaded holes that match the securing fastener 1870, they have curved sections.

| Component | Quantity | Dimensions |
|---|---|---|
| Cylinder | 1 | Inner diameter: ~79 mm; wall thickness: ~19 mm; height: ~89 mm |
| Compression rod | 1 | Diameter: ~10 mm; length: ~135 mm |
| Securing screws for cover blocks | 8 | Diameter: ~16 mm; length: ~103 mm |
| Securing screws for edge covers | 4 | Diameter: ~8 mm; length: 103 mm |
| Cover blocks | 9 | Length: ~19 mm; width: ~19 mm; height: ~19 mm |
| Edge covers | 4 | Length: ~57 mm; width: ~20 mm, height: ~19 mm |
| Grate | 1 | Diameter: ~117 mm; height: ~13 mm |
| Liner | 1 | Length: ~250 mm; height: ~80 mm; thickness: ~0.13 mm |
| Bottom plate | 1 | Diameter: ~117 mm; height: ~10 mm |
| Cover plate | 1 | Diameter: ~79 mm; height: ~3 mm |

Figures 18A, 18B, 18C, 18D:
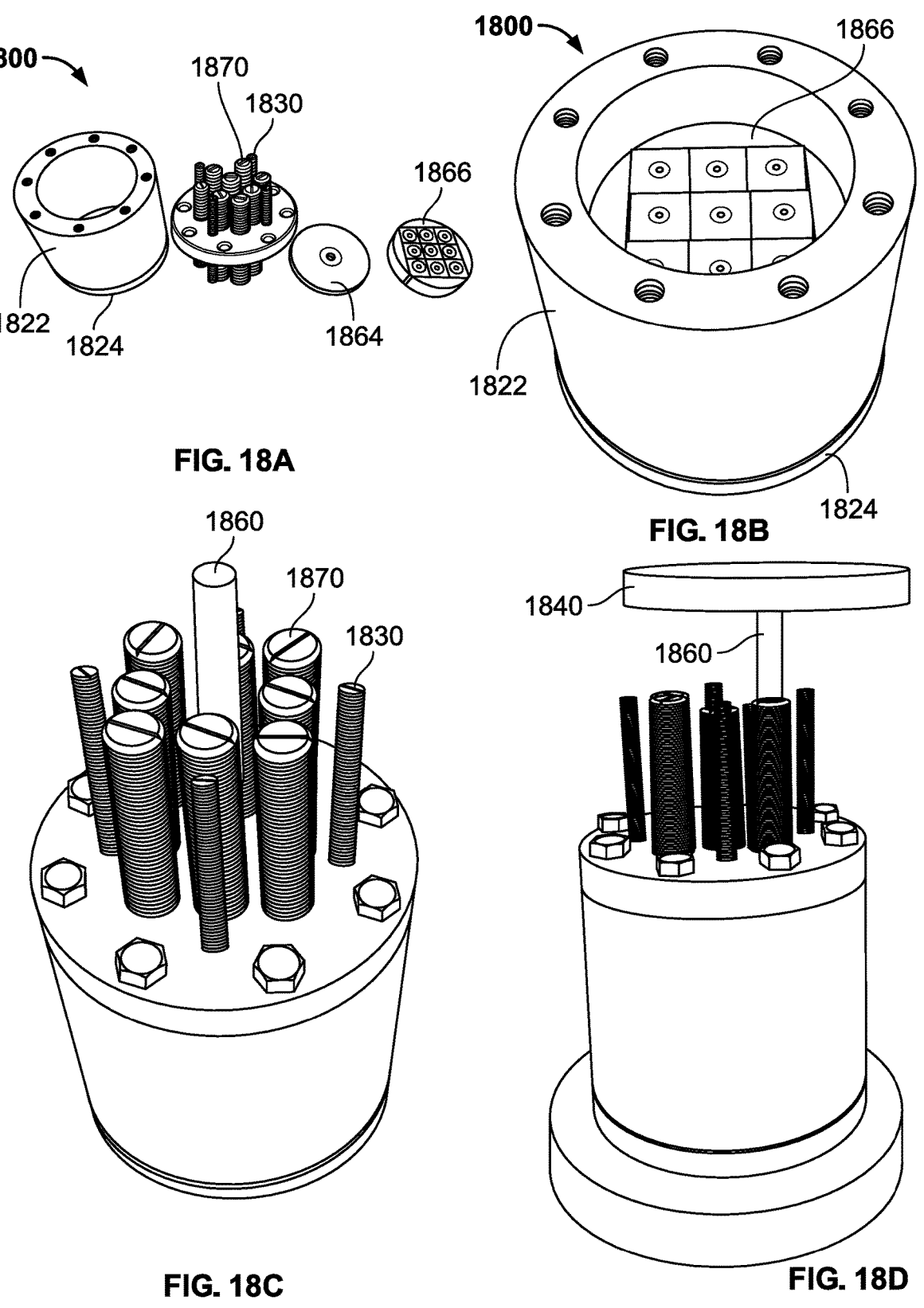
FIG. 18A shows an exploded view of an example cylindrical compaction system.
FIG. 18B shows an example steel cylinder.
FIG. 18C shows an example of the assembled cylinder having the compression rod and the securing screws.
FIG. 18D shows an example of the assembled compaction set-up.

The filler-binder mixture was flattened manually, and covered by a steel cover plate. By using an INSTRON®-5582 machine, the cover plate was compressed under 10 MPa, with the crosshead speed of 6 mm/min. The peak compression pressure was maintained for 1 min. Then, the cover plate was removed, and 9 steel cover blocks were aligned on the filler-binder mixture in a 3×3 array (FIG. 18B). A steel grate braced the cover blocks from the top, so that the cover blocks could only move vertically (FIG. 18C). The steel grate was affixed onto the cylinder wall by screws. Through a steel loading rod, the Instron machine compressed the cover blocks one by one, as shown in FIG. 18D and FIG. 19. The sectioned compaction started from the middle block, and moved to the outer blocks clockwise (e.g., as shown in FIG. 12A). The peak compaction pressure on each cover block was 40 MPa, with the crosshead speed being 6 mm/min. The peak compression pressure was maintained for 1 min. As one block was being compressed, the other eight blocks were secured on the steel grate by a set of screws and bolts. After the first round of sectioned compaction, the cover blocks and the grate were rotated by 45°, and a similar compression process was repeated, with the peak compaction pressure on each cover block (Pa) being increased to 100 MPa.

The grate and the bottom plate were removed. The compacted filler-binder mixture was gently pushed out of the cylinder, and moved into a VWR®-1330 GM convection oven. The material was cured at 150° C. for 1 h. FIG. 17D is a cured sample, and FIG. 17E shows the exposed interior.

Figure 21:
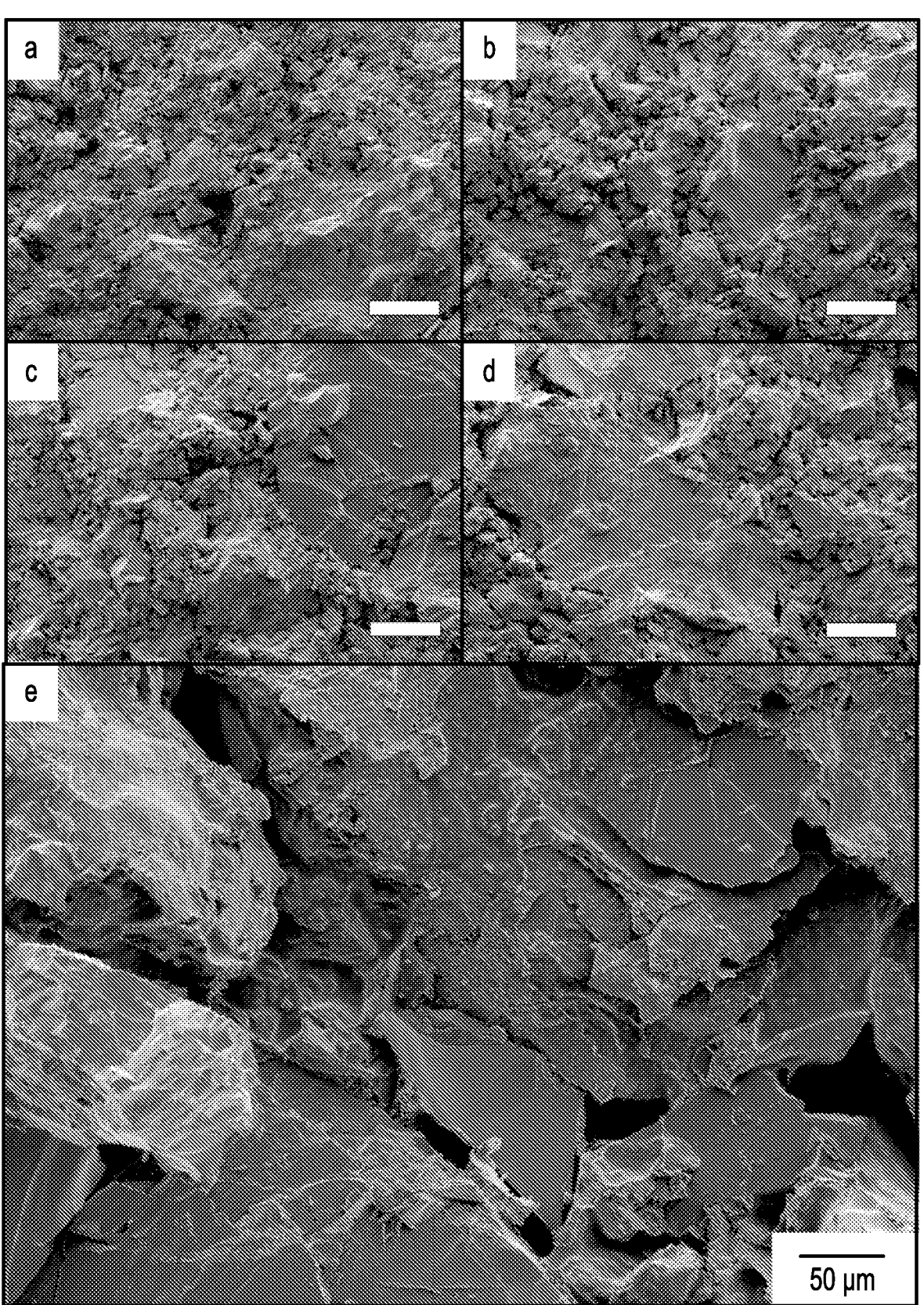
FIG. 21 shows an example of a typical scanning electron microscope (SEM) image of compressed samples.

Beam specimens were harvested from various locations of the cured sample: the upper part closer to the cover blocks, the lower part closer to the bottom plate, the interior under a cover block, and the boundary area between two cover blocks. The specimen height, width, and length were about 6.5 mm, 6.5 mm, and 20 mm, respectively. The specimens were cut by a MTI® SYJ-40-LD diamond saw, and the cut surfaces were polished by 320-grit sandpapers. Five nominally same specimens from each type of locations were tested through three-point bending. A beam specimen was simply supported at the two ends by 4 mm-diameter steel pins, with the span (L) being 16 mm. In the type-5582 INSTRON® machine, a 4 mm-diameter steel pin was pressed onto the middle point of its upper surface, until the specimen failed. The flexure strength was calculated as $$R = \frac{3}{2}\frac{P_m L}{bd^2},$$

where $P_m$ is the peak loading, b and d are the width and the height of the specimen, respectively. The flexure stress was calculated as $$\varepsilon_f = \frac{6Dd}{L^2},$$

where D is the deflection at the center point. The fractured surfaces of the specimens were observed by a QUANTA®-FEG-250 scanning electron microscope (SEM), after sputter coating of iridium. FIG. 20 summarizes the measurement results, and FIG. 21 shows typical SEM images.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A compaction system, comprising:
a mold assembly, comprising:
   a bottom wall spanning a plurality of areas of the mold assembly;
   one or more side walls coupled to the bottom wall;
   a mold cavity defined by the bottom wall and the one or more side walls and configured to contain a composite material;
   a plurality of pistons positioned within over the plurality of areas;
   a first piston of the plurality of pistons positioned over a first area of the plurality of areas of the mold assembly;
   a second piston adjacent to the first piston and positioned over a second area of the plurality of areas of the mold assembly, wherein the first piston and the second piston of the plurality of pistons are independently movable to reduce a volume of the mold cavity;
   an immobilized cover block positioned over a third area of the plurality of areas of the mold assembly and configured to constrain the composite material within the third area of the mold cavity;
   a plurality of fasteners configured to selectively immobilize the first piston and the second piston of the plurality of pistons, wherein a first fastener of the plurality of fasteners immobolizes the first piston in the initial position and a second fastener immobolizes the first piston in a second position when actuated; and
   a compression actuator configured to sequentially advance the first piston and the second piston of the plurality of pistons from an initial position to an actuated position to compress the composite material within the first area and the second area of the mold cavity.

2. The compaction system of claim 1, wherein the one or more side walls form a rectangle.

3. The compaction system of claim 1, wherein the one or more side walls form a cylinder.

4. The compaction system of claim 1, comprising a grate having a plurality of apertures.

5. The compaction system of claim 4, wherein the first piston and the second piston of the plurality of pistons traverse the grate via the plurality of apertures.

6. The compaction system of claim 1, wherein the compression actuator is selected from the group consisting of a mechanical press, a hydraulic jack, and a roller.

7. The compaction system of claim 1, wherein the first piston is movable linearly along a first axis and the second piston movable linearly along a second axis, the first axis parallel to the second axis and spaced a fixed distance from the second axis during actuating of the first piston.

8. The compaction system of claim 1, wherein:
a first fastener of the plurality of fasteners immobilizes the first piston in the initial position; and
a second fastener immobilizes the first piston in a second position when actuated.

9. The compaction system of claim 1, wherein the composite material comprises:
a filler comprising one or more of sand, soil, rocks, gravel, stones, bricks, concrete, cement, wood, metals, alloys, ceramics, polymers, glasses, carbon material, solid waste, or biomass; and
a binder comprising one or more of thermoplastic materials, thermosetting materials, elastomeric materials, polymer materials, ceramic materials, cements, glasses, carbon materials, metals, alloys, salts, and sulfur-containing materials.

\* \* \* \* \*